(12) United States Patent
Sung et al.

(10) Patent No.: US 11,890,575 B2
(45) Date of Patent: Feb. 6, 2024

(54) EXHAUST TREATMENT SYSTEM FOR AMMONIA-FUELED VEHICLES

(71) Applicant: BASF Corporation, Florham Park, NJ (US)

(72) Inventors: Shiang Sung, Iselin, NJ (US); Pushkaraj R. Patwardhan, Iselin, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 17/807,392

(22) Filed: Jun. 17, 2022

(65) Prior Publication Data

US 2022/0323905 A1 Oct. 13, 2022

Related U.S. Application Data

(63) Continuation-in-part of application No. PCT/US2020/065253, filed on Dec. 16, 2020.
(Continued)

(51) Int. Cl.
| | |
|---|---|
| *B01D 53/94* | (2006.01) |
| *B01J 23/58* | (2006.01) |
| *B01J 23/656* | (2006.01) |
| *B01J 21/04* | (2006.01) |
| *B01J 29/68* | (2006.01) |
| *B01J 23/44* | (2006.01) |
| *B01J 23/34* | (2006.01) |
| *B01J 21/12* | (2006.01) |
| *B01J 29/76* | (2006.01) |
| *B01J 35/00* | (2006.01) |

(Continued)

(52) U.S. Cl.
CPC ....... *B01D 53/9477* (2013.01); *B01D 53/944* (2013.01); *B01D 53/9418* (2013.01); *B01D 53/9468* (2013.01); *B01D 53/9472* (2013.01); *B01D 53/9481* (2013.01); *B01J 21/04* (2013.01); *B01J 21/12* (2013.01); *B01J 23/34* (2013.01); *B01J 23/44* (2013.01); *B01J 23/58* (2013.01); *B01J 23/6562* (2013.01); *B01J 29/68* (2013.01); *B01J 29/763* (2013.01); *B01J 35/0006* (2013.01); *F01N 3/106* (2013.01); *F01N 3/2066* (2013.01); *F01N 3/2803* (2013.01); *B01D 2255/1021* (2013.01); *B01D 2255/1023* (2013.01); *B01D 2255/2042* (2013.01); *B01D 2255/2073* (2013.01); *B01D 2255/20723* (2013.01); *B01D 2255/20738* (2013.01); *B01D 2255/20761* (2013.01); *B01D 2255/50* (2013.01); *B01D 2255/904* (2013.01); *B01D 2255/9022* (2013.01); *B01D 2255/9032* (2013.01); *B01D 2255/91* (2013.01); *B01D 2255/911* (2013.01); *F01N 2370/02* (2013.01)

(58) Field of Classification Search
CPC ............ B01D 53/9477; B01D 53/9418; B01D 53/944; B01D 53/9468; B01D 53/9472; B01D 53/9481; B01D 2255/1021; B01D 2255/1023; B01D 2255/2042; B01D 2255/20723; B01D 2255/2073; B01D 2255/20738; B01D 2255/20761; B01D 2255/50; B01D 2255/9022; B01D 2255/9032; B01D 2255/904; B01D 2255/91; B01D 2255/911; B01J 21/04; B01J 21/12; B01J 23/44; B01J 23/58; B01J 23/6562; B01J 29/68; B01J 29/763; B01J 35/0006; F01N 3/106; F01N 3/2066; F01N 3/2803; F01N 2370/02
See application file for complete search history.

(56) References Cited

U.S. PATENT DOCUMENTS

| 8,240,277 B1 | 8/2012 | Michikawauchi et al. |
| 2007/0012032 A1* | 1/2007 | Hu ........................ F01N 3/0842 60/301 |

(Continued)

FOREIGN PATENT DOCUMENTS

| DE | 11 2011 101487 T5 | 2/2013 |
| EP | 2 378 094 A1 | 10/2011 |

(Continued)

OTHER PUBLICATIONS

International Search Report & Written Opinion dated Apr. 15, 2021, PCT/US2020/064253.

*Primary Examiner* — Timothy C Vanoy
(74) *Attorney, Agent, or Firm* — DLA Piper LLP (US)

(57) ABSTRACT

The present disclosure is directed to an emission treatment system for $NO_x$ abatement in an exhaust stream of an ammonia-fueled engine, the emission treatment system including a selective catalytic reduction (SCR) catalyst disposed on a substrate in fluid communication with the exhaust stream, an oxidation catalyst disposed on a substrate positioned either upstream or downstream of the SCR catalyst and in fluid communication with the exhaust stream and the SCR catalyst, and optionally, one or more adsorption components disposed on a substrate positioned upstream and/or downstream of the SCR catalyst and in fluid communication with the exhaust stream and the SCR catalyst, the adsorption component chosen from low temperature $NO_x$ adsorbers (LT-NA), low temperature ammonia adsorbers (LT-AA), low temperature water vapor adsorbers (LT-WA), and combinations thereof. The disclosure further provides a related method of treatment of an exhaust gas.

24 Claims, 9 Drawing Sheets

Related U.S. Application Data

(60) Provisional application No. 62/950,497, filed on Dec. 19, 2019.

(51) Int. Cl.
    *F01N 3/10*      (2006.01)
    *F01N 3/20*      (2006.01)
    *F01N 3/28*      (2006.01)

(56) References Cited

U.S. PATENT DOCUMENTS

| | | | |
|---|---|---|---|
| 2010/0019506 A1* | 1/2010 | Gong | F01N 3/106 |
| | | | 290/1 A |
| 2011/0265455 A1 | 11/2011 | Hirota | |
| 2011/0283960 A1* | 11/2011 | Hikazudani | C01B 3/047 |
| | | | 123/3 |
| 2014/0311428 A1 | 10/2014 | Miyagawa | |
| 2020/0173327 A1* | 6/2020 | Ren | B01D 53/9495 |
| 2022/0162971 A1* | 5/2022 | Montgomery | F01N 3/0842 |

FOREIGN PATENT DOCUMENTS

| | | | | |
|---|---|---|---|---|
| EP | 2 565 436 A1 | 3/2013 | | |
| EP | 2 565 437 A1 | 3/2013 | | |
| JP | 2019 167823 A | 10/2019 | | |
| WO | WO 2010 058 807 A1 * | 5/2010 | | B01D 53/9436 |
| WO | WO 2012 063 846 A1 * | 5/2012 | | B01J 23/28 |

* cited by examiner

Fig. 1A
Fig. 1B
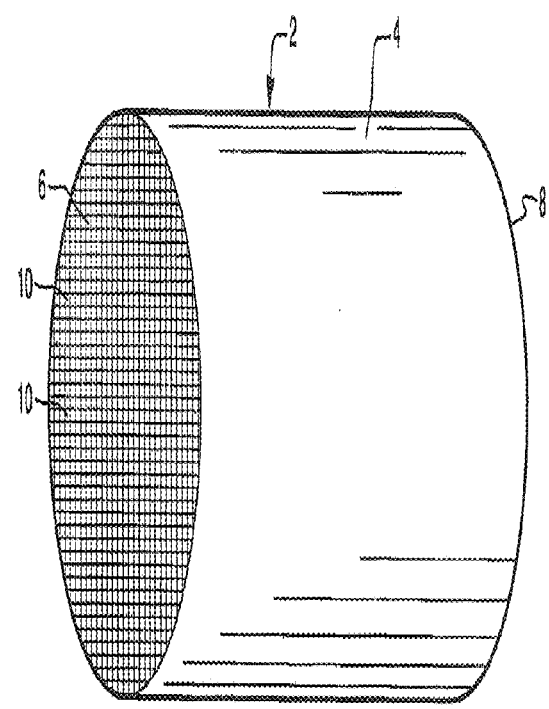
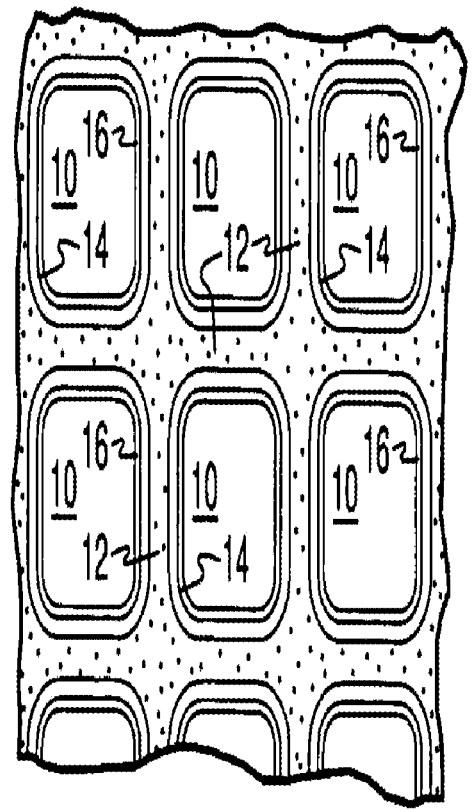

EXHAUST TREATMENT SYSTEM FOR AMMONIA-FUELED VEHICLES

This is a bypass continuation-in-part of International Application No. PCT/US2020/065253, filed Dec. 16, 2020, which claims the benefit of U.S. provisional application No. 62/950,497, filed Dec. 19, 2019, all of the disclosures of which are incorporated herein by reference in their entirety.

The present disclosure is directed to compositions, components, emission treatment systems, and methods suitable for treating the exhaust gas stream of an ammonia-fueled internal combustion engine to reduce emissions of nitrogen oxides ($NO_x$).

Environmental regulations for emissions of internal combustion engines are becoming increasingly stringent throughout the world in an effort to reduce greenhouse gas emissions such as $CO_2$ emissions. Increasingly, vehicle manufacturers are focusing attention on engines that utilize fuels other than traditional hydrocarbon-based fuel. Electric vehicles and hydrogen-burning vehicles have received much attention in recent years, but widespread implementation of these engine systems has not yet occurred. Both electric and hydrogen engine systems suffer from certain drawbacks, including safety concerns associated with storing hydrogen under high pressure, the weight of battery packs, and the fact that the electricity needed for electric engines is often produced using fossil fuels.

One of the least intrusive ways to achieve reduction in greenhouse gas is to change fuel from gasoline/diesel to ammonia, a non-hydrocarbon fuel. Ammonia is one of only a few compounds that is liquid at room temperature, rapidly releases energy upon combustion, and which provides a high energy density by volume.

Ammonia is comprised of only hydrogen and nitrogen atoms. Thus, when burned, ammonia will not release carbon dioxide, carbon monoxide, or other greenhouse pollutants. The emissions from the burned ammonia are typically nitrogen and water vapor. More particularly, complete combustion of ammonia can be described by the following equation:

$$4NH_3 + 3O_2 + heat \rightarrow 2N_2 + 6H_2O.$$

$[\Delta H°_r = -1267.20$ kJ/mol (or $-316.8$ kJ/mol if expressed per mol of $NH_3$)]

However, some unburned $NH_3$ and some trace amount of over-combustion products can occur, such as through the following reaction:

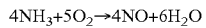

$$4NH_3 + 5O_2 \rightarrow 4NO + 6H_2O$$

As ammonia has about 20% less heating value (energy content) than diesel on a volume-basis, more ammonia fuel is necessary to generate the same power as a diesel-fueled vehicle. Hence, it would be highly desirable to provide an emission treatment system that provides, for example, effective NOx reduction for ammonia-fueled engines.

The present disclosure is directed to emission treatment systems and methods for $NO_x$ abatement in an exhaust stream of an ammonia-fueled engine. In some embodiments, such systems can be effective to not only abate $NO_x$ emissions associated with such engines, but also to adsorb certain gaseous components of exhaust streams emitted by such engines in order to enhance the effectiveness of the system. In some embodiments, the emission treatment systems of the disclosure can combine a selective catalytic reduction (SCR) catalyst with an oxidation catalyst positioned either upstream or downstream of the SCR catalyst. In other embodiments, the emission treatment systems of the disclosure can combine a selective catalytic reduction (SCR) catalyst and an oxidation catalyst with one or more adsorption components chosen from low temperature $NO_x$ adsorbers (LT-NA), low temperature ammonia adsorbers (LT-AA), and low temperature water vapor adsorbers (LT-WA).

The disclosure includes, without limitations, the following embodiments.

Embodiment 1: An emission treatment system for $NO_x$ abatement in an exhaust stream of an ammonia-fueled engine, the emission treatment system comprising:
  a selective catalytic reduction (SCR) catalyst disposed on a substrate in fluid communication with the exhaust stream of the ammonia-fueled engine; and
  an oxidation catalyst disposed on a substrate positioned upstream and/or downstream of the SCR catalyst and in fluid communication with the exhaust stream and the SCR catalyst.

Embodiment 2: The emission treatment system of embodiment 1, wherein the oxidation catalyst comprises a refractory metal oxide support impregnated with a platinum group metal (PGM).

Embodiment 3: The emission treatment system of embodiment 2, wherein the PGM comprises platinum, palladium, or a combination thereof.

Embodiment 4: The emission treatment system of any one of embodiments 2 to 3, wherein the oxidation catalyst further comprises a refractory metal oxide support impregnated with a non-PGM transition metal, an alkaline earth metal, or a combination thereof.

Embodiment 5: The emission treatment system of embodiment 4, wherein the non-PGM transition metal comprises manganese.

Embodiment 6: The emission treatment system of any one of embodiments 4 to 5, wherein the alkaline earth metal comprises barium Embodiment 7: The emission treatment system of any one of embodiments 1 to 6, wherein the oxidation catalyst is selected from a diesel oxidation catalyst (DOC) and a selective ammonia oxidation catalyst (AMOx).

Embodiment 8: The emission treatment system of any one of embodiments 1 to 7, wherein the SCR catalyst comprises a metal-promoted molecular sieve, a vanadia-based composition, or a combination thereof.

Embodiment 9: The emission treatment system of any one of embodiments 1 to 8, wherein the SCR catalyst and the oxidation catalysts are present in the form of an SCR/AMOx catalyst.

Embodiment 10: The emission treatment system of any one of embodiments 1 to 9, wherein the SCR catalyst is a copper-, an iron-, or a manganese-containing zeolite.

Embodiment 11: The emission treatment system of embodiment 10, wherein the zeolite has a framework type chosen from LEV, CHA, AEI, MEI, FER, or a combination thereof.

Embodiment 12: The emission treatment system of any one of embodiments 1 to 11, further comprising one or more adsorption components chosen from a low-temperature $NO_x$ adsorber (LT-NA), a low temperature ammonia adsorber (LT-AA), a low temperature water vapor adsorber (LT-WA), or a combination thereof.

Embodiment 13: The emission treatment system of embodiment 12, wherein the one or more adsorption components are arranged in any order and combination.

Embodiment 14: The emission treatment system of any one of embodiments 12 to 13, wherein each of the one or more adsorption components is disposed on a substrate, positioned upstream or downstream of the SCR catalyst, and in fluid communication with the exhaust stream and the SCR catalyst.

Embodiment 15: The emission treatment system of any one of embodiments 12 to 14, wherein each of the one or more adsorption components are disposed on the same substrate as a mixture, in a zoned configuration, or in a layered configuration.

Embodiment 16: The emission treatment system of any one of embodiments 12 to 15, wherein one or more of the SCR catalyst, the oxidation catalyst, and the one or more adsorption components are disposed on the same substrate, as a mixture, in a zoned configuration, or in a layered configuration.

Embodiment 17: The emission treatment system of any one of embodiments 12 to 16, wherein the one or more adsorption components and a DOC are disposed on the same substrate as a mixture, in a zoned configuration, or in a layered configuration.

Embodiment 18: The emission treatment system of any one of embodiments 1 to 17, further comprising one or more additional SCR catalysts, one or more additional oxidation catalysts, or combinations thereof.

Embodiment 19: The emission treatment system of embodiment 18, comprising, in order, beginning with the emission treatment component closest to the engine, one of the following arrangements:
  (a) Adsorption component(s), DOC, SCR catalyst, and AMOx;
  (b) SCR, Adsorption component(s), DOC, and AMOx;
  (c) Adsorption component(s), SCR catalyst, DOC, SCR catalyst, and AMOx;
  (d) Adsorption component(s), SCR catalyst, and AMOx;
  (e) Adsorption component(s), DOC, and SCR catalyst;
  (f) SCR catalyst, AMOx, and adsorption component(s);
  (f) SCR catalyst and AMOx; or
  (g) DOC and SCR catalyst.

Embodiment 20: The emission treatment system of any one of embodiments 12 to 19, wherein the LT-NA is present and comprises a molecular sieve, impregnated with at least one platinum group metal component, or a metal organic framework (MOF).

Embodiment 21: The emission treatment system of any one of embodiments 12 to 20, wherein the LT-AA is present and comprises a molecular sieve or a MOF.

Embodiment 22: The emission treatment system of any one of embodiments 12 to 21, wherein the LT-WA is present and chosen from molecular sieves, clays, activated charcoal, activated alumina, silica, calcium sulfate, calcium chloride, a MOF, and combinations thereof.

Embodiment 23: The emission treatment system of any one of embodiments 12 to 22, wherein one or more of the SCR catalyst, the one or more adsorption components, and the oxidation catalyst are disposed on a flow-through substrate in the form of a honeycomb having a plurality of longitudinally-extending gas flow passages extending from an inlet to an outlet, and/or wherein one or more of the SCR catalyst, the one or more adsorption components, and the oxidation catalyst are disposed on a wall-flow substrate or optionally on a metal substrate with flow-through channels wherein a part of the exhaust gas is in fluid communication between channels.

Embodiment 24: A method for abating $NO_x$ in an exhaust stream from an ammonia-fueled engine, the method comprising contacting the exhaust gas stream with the emission treatment system of any one of embodiments 1 to 23.

These and other features, aspects, and advantages of the disclosure will be apparent from a reading of the following detailed description together with the accompanying drawings, which are briefly described below. The disclosure includes any combination of two, three, four, or more of the above-noted embodiments as well as combinations of any two, three, four, or more features or elements set forth in this disclosure, regardless of whether such features or elements are expressly combined in an embodiment description herein. This disclosure is intended to be read holistically such that any separable features or elements, in any of its various aspects and embodiments, should be viewed as intended to be combinable unless the context clearly dictates otherwise.

In order to provide an understanding of embodiments of the disclosure, reference is made to the appended drawings, in which reference numerals refer to components of example embodiments of the disclosure. The drawings are illustrative only, and should not be construed as limiting the disclosure. The disclosure described herein is illustrated by way of example and not by way of limitation in the accompanying figures. For simplicity and clarity of illustration, features illustrated in the figures are not necessarily drawn to scale. Further, where considered appropriate, reference labels have been repeated among the figures to indicate corresponding or analogous elements.

FIG. 1A depicts a perspective view of an exemplary honeycomb-type substrate, which may comprise a composition washcoat in accordance with some exemplary embodiments.

FIG. 1B depicts a partial cross-sectional view enlarged relative to FIG. 1A and taken along a plane parallel to the end faces of the substrate of FIG. 1A, which shows an enlarged view of a plurality of the gas flow passages shown in FIG. 1A, in an exemplary embodiment wherein the substrate is a flow-through substrate.

Figure 2:
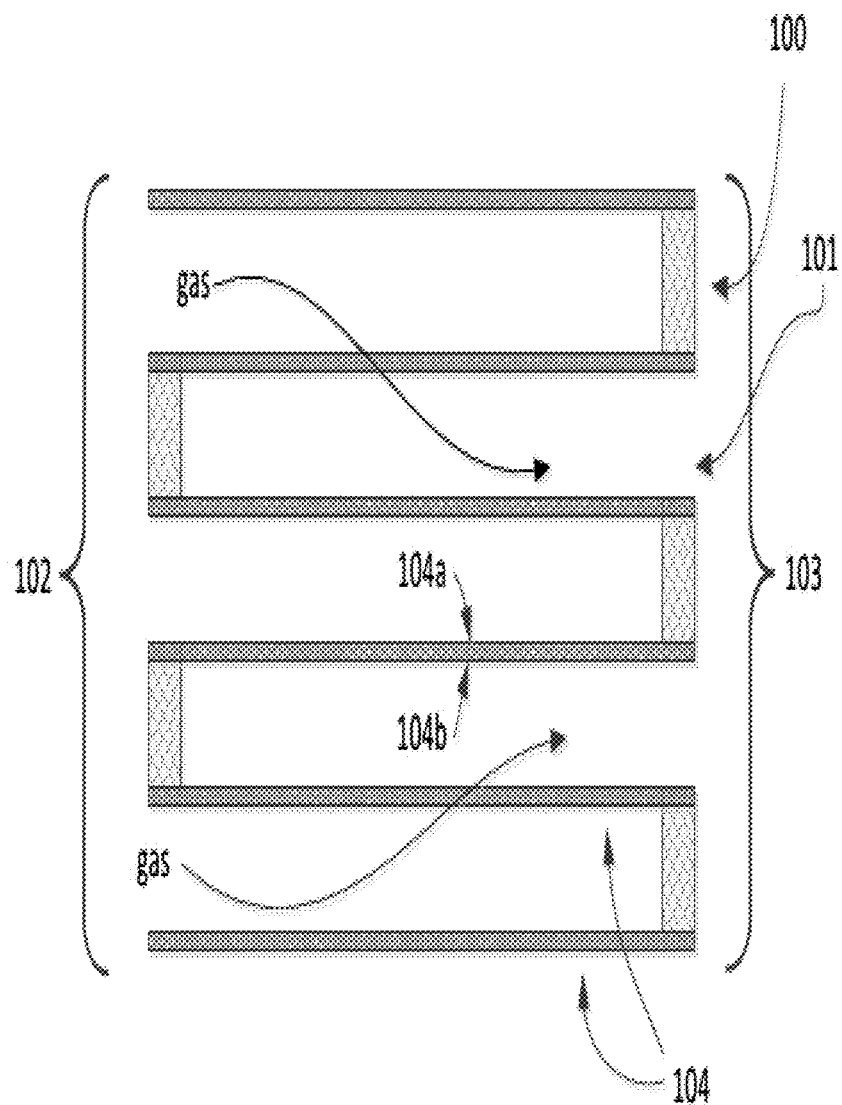
FIG. 2 depicts a cutaway view of a section enlarged relative to FIG. 1A, wherein the honeycomb-type substrate in FIG. 1A represents an exemplary wall-flow filter.

The present disclosure now will be described more fully hereinafter. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

Definitions

As used herein, "a" and "an" entity refers to one more of that entity, e.g., "a compound" refers to one or more compounds or at least one compound unless stated otherwise. As such, the terms "a" (or "an"), "one or more", and "at least one" are used interchangeably herein.

Any ranges cited herein are inclusive. The term "about" used throughout is used to describe and account for small variations. For instance, "about" may mean the numeric value may be modified by ±5%, ±4%, ±3%, ±2%, ±1%, ±0.5%, ±0.4%, ±0.3%, ±0.2%, ±0.1%, or ±0.05%. Numeric values modified by the term "about" include the specific identified value. For example, "about 5.0" includes 5.0.

The term "abatement" means a decrease in the amount, caused by any means.

The term "adsorbent" refers to a material that adsorbs and/or absorbs a desired substance. Adsorbents may advantageously adsorb and/or absorb (store) a substance at a certain temperature and desorb (release) the substance at a higher temperature.

The term "associated" means for instance "equipped with", "connected to" or in "communication with", for example "electrically connected" or in "fluid communication with" or otherwise connected in a way to perform a function. The term "associated" may mean directly associated with or indirectly associated with, for instance through one or more other articles or elements.

The term "catalyst" refers to a material that promotes a chemical reaction. The catalyst comprises the "catalytically active species" and the "support" that carries or supports the active species. For example, zeolites may be a support for palladium active catalytic species. Likewise, refractory metal oxide particles may be a support for platinum group metal catalytic species. The catalytically active species are also termed "promoters" as they promote chemical reactions.

The term "catalytic article" in the disclosure means an article comprising a substrate having a catalyst coating composition.

The term "configured" as used in the description and claims is intended to be an open-ended term as are the terms "comprising" or "containing." The term "configured" is not meant to exclude other possible articles or elements. The term "configured" may be equivalent to "adapted."

In general, the term "effective" means, for example, from about 35% to 100% effective, for instance from about 40%, about 45%, about 50%, about 55%, about 60%, about 65%, about 70%, about 75%, about 80%, about 85%, about 90%, or about 95%, regarding the defined catalytic activity or storage/release activity, by weight or by moles.

The term "exhaust stream" or "exhaust gas stream" refers to any combination of flowing gas that may contain solid or liquid particulate matter. The stream comprises gaseous components and may be, for example, exhaust of a lean burn engine, which may contain certain non-gaseous components such as liquid droplets, solid particulates and the like. The exhaust gas stream of a combustion engine can further comprise, for example, combustion products ($CO_2$ and $H_2O$), products of incomplete combustion (carbon monoxide (CO) and hydrocarbons), oxides of nitrogen ($NO_x$), combustible and/or carbonaceous particulate matter (soot), and un-reacted oxygen and nitrogen. In ammonia-fueled engines, the exhaust stream may consist of nitrogen, water vapor, and small amounts of NOx in certain embodiments. However, in dual-fuel systems, some of the other materials noted above may be present, although in smaller amounts as compared to conventional engines.

As used herein, the terms "upstream" and "downstream" refer to relative directions according to the flow of an engine exhaust gas stream from an engine towards a tailpipe, with the engine in an upstream location and the tailpipe and any pollution abatement articles, such as filters and catalysts, being downstream from the engine. The inlet end of a substrate is synonymous with the "upstream" end or "front" end. The outlet end is synonymous with the "downstream" end or "rear" end. An upstream zone is upstream of a downstream zone. An upstream zone may be closer to the engine or manifold, and a downstream zone may be further away from the engine or manifold.

The term "in fluid communication" is used to refer to articles positioned on the same exhaust line, i.e., a common exhaust stream passes through articles that are in fluid communication with each other. Articles in fluid communication may be adjacent to each other in the exhaust line. Alternatively, articles in fluid communication may be separated by one or more articles, also referred to as "washcoated monoliths."

As used herein, "impregnated" or "impregnation" refers to permeation of the catalytic material into the porous structure of the support material.

The terms "on" and "over" and "overlapping" in reference to a coating layer may be used synonymously. The term "directly on" means in direct contact with. The disclosed articles are referred to in certain embodiments as comprising one coating layer "on" a second coating layer, and such language is intended to encompass embodiments with intervening layers, where direct contact between the coating layers is not required (i.e., "on" is not equated with "directly on").

As used herein, the terms "nitrogen oxides" and "$NO_x$" designate the oxides of nitrogen, such as NO, $NO_2$, or $N_2O$.

"Substantially free" means "little or no" or "no intentionally added" and also permits having only trace and/or inadvertent amounts. For instance, in certain embodiments, "substantially free" means less than 2 wt % (weight %), less than 1.5 wt %, less than 1.0 wt %, less than 0.5 wt %, less than 0.25 wt %, or less than 0.01 wt %, based on the weight of the indicated total composition.

As used herein, the term "washcoat" has its usual meaning in the art of a thin, adherent coating of a catalytic or other material applied to a substrate material, such as a honeycomb-type substrate, which is sufficiently porous to permit the passage of the gas stream being treated. As used herein and as described in Heck, Ronald and Farrauto, Robert, Catalytic Air Pollution Control, New York: Wiley-Interscience, 2002, pp. 18-19, a washcoat layer comprises s a compositionally distinct layer of material disposed on the surface of a monolithic substrate or an underlying washcoat layer. A substrate can contain one or more washcoat layers, and each washcoat layer can be different in some way (e.g., may differ in physical properties thereof such as, for example particle size or crystallite phase) and/or may differ in the chemical catalytic functions. A washcoat is, for example, formed by preparing a slurry containing a specified solids content (e.g., 30-90% by weight) of catalyst in a liquid, which is then coated onto a substrate and dried to provide a washcoat layer.

"Weight percent (wt %)," if not otherwise indicated, is based on an entire composition free of any volatiles, that is, based on dry solids content. Unless otherwise indicated, all parts and percentages are by weight.

All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods. All U.S. patent applications, Pre-Grant publications, and patents referred to herein are hereby incorporated by reference in their entireties.

Emission Treatment System

In a first aspect, an emission treatment system may be adapted for use with ammonia-fueled internal combustion engines, which includes dual-fuel systems. Engine systems that combust ammonia are known in the art and shown, for example, in U.S. Pat. Nos. 8,464,515; 8,904,994; and 9,341,111, as well as in U.S. Publ. Nos. 2011/0265463; 2011/0283684; and 2018/0100469, all of which are incorporated by reference herein. Such engines are similar to other types of combustion engines, and can comprise an engine body, a cylinder block, one or more cylinder heads, one or more pistons, one or more combustion chambers, one or more spark plugs (e.g., plasma jet spark plugs) arranged at the top surface of each combustion chamber, intake valves, intake ports, exhaust valves, and exhaust ports. Each intake port can be in fluid communication with an ammonia injector for injecting ammonia, and in dual-fuel systems sometimes used to enhance the ignition properties of ammonia-fueled engines, the intake port may also be in fluid communication with a secondary combustible fuel, such as a hydrocarbon fuel or hydrogen. In certain ammonia-fueled engines, exhaust from the combustion chamber containing ammonia passes through a reforming or cracking catalyst in order to produce hydrogen gas, which is then fed back to the intake port for enhancing the ignition properties of the engine. In certain embodiments, the ammonia-fueled engine can utilize ammonia only as the combustion fuel. In other embodiments, the ammonia-fueled engine is a dual-fuel engine that utilizes ammonia and one or more additional combustion fuel (e.g., hydrogen or hydrocarbon fuel).

In certain embodiments, the emission treatment system combines an SCR catalyst for abatement of NOx in the exhaust stream with one or more adsorbent adapted to adsorb one or more of water, NOx, and $NH_3$. The SCR catalyst is needed to abate NOx that can result from combustion of ammonia under certain operating conditions. The emission treatment system further comprises an oxidation catalyst. In some embodiments, the oxidation catalyst is an ammonia oxidation catalyst (AMOx) to oxidize any residual ammonia in the exhaust stream (or trace amounts of CO or hydrocarbon fuel in a dual-fuel engine). In some embodiments, the oxidation catalyst is a diesel oxidation catalyst to oxidize CO and/or hydrocarbon species, such as from a dual-fuel engine, into carbon dioxide and water vapor. In a single-fuel $NH_3$ engine, a DOC catalyst may be incorporated in the emission treatment system to oxidize trace amounts of hydrocarbon species, such as engine lubricants or feedstock impurities, that may further comprise the exhaust gas stream. In some embodiments, the emission treatment system may comprise one or more oxidation catalyst, such as a DOC and an AMOx.

In certain embodiments, a water adsorbent is useful during low temperature (e.g., cold start) conditions to prevent water condensation within the emission treatment system that can impair catalyst function and/or hinder NOx adsorption. In some embodiments, the water adsorbent is advantageously located upstream of the NOx adsorbent in order to enhance the effectiveness of the NOx adsorption. In certain embodiments, the NOx adsorbent and the $NH_3$ adsorbent are useful during low temperature conditions to sequester NOx or $NH_3$, respectively, until the exhaust temperature is sufficiently high for effective SCR catalyst performance.

Figure 3:
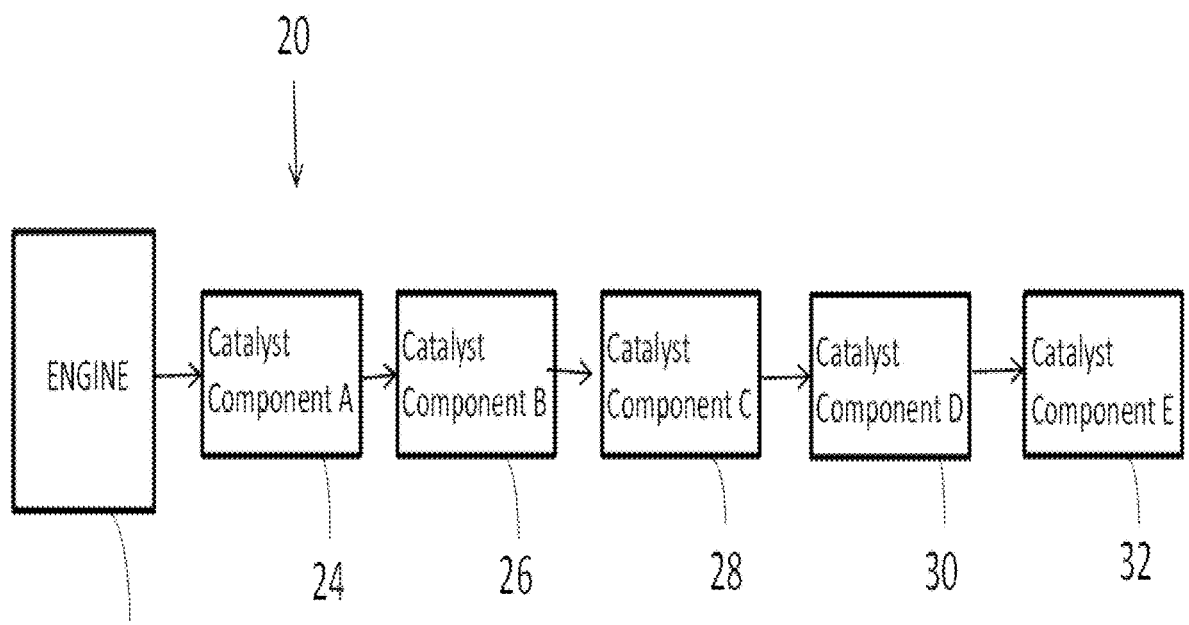
FIG. 3 depicts a schematic depiction of an exemplary embodiment of an emission treatment system.

One exemplary emission treatment system is illustrated in FIG. 3, which depicts a schematic representation of a non-limiting exhaust gas treatment system in accordance with exemplary embodiments of the present disclosure. As shown, the emission treatment system 20 can comprise a plurality of components in series downstream of an engine 22, such as an ammonia-fueled engine. FIG. 3 illustrates five components, 24, 26, 28, 30, 32 in series; however, the total number of components can vary and five components is merely one example. Although FIG. 3 describes each component as a "catalyst component" for the sake of simplicity, not every component must comprise a catalyst. For example, some components may consist of adsorption compositions.

Without limitation, Table 1 presents various exhaust gas treatment system configurations of one or more exemplary embodiments. It is noted that each component is connected to the next component via exhaust conduits such that the engine is upstream of component A, which is upstream of component B, which is upstream of component C, which is upstream of component D, which is upstream of component E (when present). The reference to components A-E in the table can be cross-referenced with the same designations in FIG. 3.

As recognized by one skilled in the art, Table 1 is a non-exhaustive listing of configurations and any one or more of components A, B, C, D, or E can be disposed on the same or different substrate, such as a particulate filter, such as a wall flow filter, or on a flow-through honeycomb substrate. In some embodiments, each of the components of the engine exhaust system are on the same substrate. In some embodiments, more than one substrate may be used for the components of the engine exhaust system.

In one or more embodiments, an engine exhaust system comprises one or more components mounted in a position near the engine (in a close-coupled position, CC), with additional components in a position underneath the vehicle body (in an underfloor position, UF). The reductant used herein for the SCR catalysts comprises ammonia. The ammonia can be provided through a separate injection line in front of the SCR catalyst, or the ammonia can be provided through the release of the stored ammonia in the LT-AA, or combination of the above.

In one or more embodiments, the exhaust gas treatment system may further comprise an ammonia or ammonia precursor injection component, for example, placed upstream of any SCR catalyst present in the system. In Table 1, adsorption components may comprise a low temperature NOx adsorber (LT-NA), a low temperature $NH_3$ adsorber (LT-AA), a low temperature $H_2O$ (water vapor) adsorber (LT-WA), or a combination thereof. "SCR" refers to a selective catalytic reduction catalyst, DOC refers to a diesel oxidation catalyst, and "AMOx" refers to an ammonia oxidation catalyst, all of which are described in greater detail hereinbelow.

TABLE 1

Possible exhaust gas treatment system configurations

| Component A | Component B | Component C | Component D | Component E |
|---|---|---|---|---|
| DOC | SCR | — | — | — |
| SCR | AMOx | — | — | — |
| Adsorption components | SCR | AMOx | — | — |
| SCR | AMOx | Adsorption components | — | — |
| Adsorption components | DOC | SCR | — | — |
| Adsorption components | DOC | SCR | AMOx | — |
| SCR | Adsorption components | DOC | AMOx | — |
| Adsorption components | SCR | DOC | SCR | AMOx |

The adsorption components may be in any order and in any combination. For example, the adsorption components of the emission treatment system of the present disclosure may be LT-AA; LT-WA; LT-NA; LT-AA, LT-WA; LT-AA, LT-NA; LT-WA, LT-NA; LT-WA, LT-NA, LT-AA; LT-NA, LT-WA, LT-AA; LT-WA, LT-A, LT-NA; LT-AA, LT-NA, LT-WA. In some embodiments, the adsorption components may be disposed on the same or different substrates. For example, the emission treatment system of the present disclosure may comprise LT-AA, LT-NA, and LT-WA on the same substrate; LT-NA and LT-WA disposed on the same substrate and LT-AA on a different substrate; and LT-NA and LT-AA disposed on the same substrate.

SCR Catalyst Compositions

In certain embodiments, the SCR catalyst composition comprises a metal-promoted (e.g., Cu-promoted, Fe-promoted, or Cu/Fe-promoted) molecular sieve. The phrase "molecular sieve," as used herein refers to framework materials such as zeolites and other framework materials (e.g. isomorphously substituted materials), which may be used, e.g., in particulate form, in combination with one or more promoter metals, as catalysts. Molecular sieves are materials based on an extensive three-dimensional network of oxygen ions containing generally tetrahedral type sites and having a substantially uniform pore distribution, with the average pore size being no larger than 20 Å. The pore sizes are defined by the ring size. As used herein, the term "zeolite" refers to a specific example of a molecular sieve, further including silicon and aluminum atoms. According to one or more embodiments, it will be appreciated that defining the molecular sieves by their structure type is intended to comprise both molecular sieves having that structure type and any and all isotypic framework materials such as SAPO, AlPO, and MeAPO materials having the same structure type.

In some embodiments, reference to an aluminosilicate zeolite structure type limits the material to molecular sieves that do not purposely include phosphorus or other metals substituted in the framework. To be clear, as used herein, "aluminosilicate zeolite" excludes aluminophosphate materials such as SAPO, AlPO, and MeAPO materials, and the broader term "zeolite" is intended to include aluminosilicates and aluminophosphates. Zeolites are crystalline materials, understood to be aluminosilicates with open 3-dimensional framework structures composed of corner-sharing $TO_4$ tetrahedra, where T is Al or Si. Zeolites generally comprise silica to alumina (SAR) molar ratios of 2 or greater. Zeolites for use in the disclosed catalyst compositions are not particularly limited in terms of SAR values, although the particular SAR value associated with a zeolite may, in some embodiments, affect the SCR performance of the catalyst composition into which it is incorporated (e.g., particularly after aging). In some embodiments, the SAR values of the zeolites are from about 5 to about 100 or from about 5 to about 50. In some embodiments, the SAR is from about 5 to about 20 and, in other embodiments, the SAR is from about 20 to about 50.

Cations that balance the charge of the anionic framework are loosely associated with the framework oxygens, and the remaining pore volume may be potentially filled with water molecules. The non-framework cations are generally exchangeable, and the water molecules removable. Zeolites can have rather uniform pore sizes that, depending upon the type of zeolite and the type and amount of cations included in the zeolite lattice, range from about 3 Angstroms to about 10 Angstroms in diameter.

Molecular sieves can be classified by means of the framework topology by which the structures are identified. For example, any structure type of zeolite can be used, such as structure types of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DOH, DON, EAB, EDI, EMT, EON, EPI, ERI, ESV, ETR, EUO, FAU, FER, FRA, GIS, GIU, GME, GON, GOO, HEU, IFR, IHW, ISV, ITE, ITH, ITW, IWR, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWW, NAB, NAT, NES, NON, NPO, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SOD, SOS, SSY, STF, STI, STT, TER, THO, TON, TSC, UEI, UFI, UOZ, USI, UTL, VET, VFI, VNI, VSV, WIE, WEN, YUG, ZON, or combinations thereof. In certain embodiments, the structure type is chosen from AEI, AFT, AFV, AFX, AVL, CHA, DDR, EAB, EEI, ERI, IFY, IRN, KFI, LEV, LTA, LTN, MER, MWF, NPT, PAU, RHO, RTE, RTH, SAS, SAT, SAV, SFW, TSC, UFI, and combinations thereof. Existing intergrowths of these materials, e.g., including, but not limited to AEI-CHA are also intended to be encompassed herein.

Zeolites are comprised of secondary building units (SBU) and composite building units (CBU), and appear in many different framework structures. Secondary building units contain up to 16 tetrahedral atoms and are non-chiral. Composite building units are not required to be achiral, and cannot necessarily be used to build the entire framework. For example, a group of zeolites may have a single 4-ring (s4r) composite building unit in their framework structure. In the 4-ring, the "4" denotes the positions of tetrahedral silicon and aluminum atoms, and the oxygen atoms are located between tetrahedral atoms. Other composite building units include, for example, a single 6-ring (s6r) unit, a double 4-ring (d4r) unit, and a double 6-ring (d6r) unit. The d4r unit is created by joining two s4r units. The d6r unit is created by joining two s6r units. In a d6r unit, there are twelve tetrahedral atoms. Zeolitic structure types that have a d6r secondary building unit include AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, WEN, and combinations thereof. In one or more embodiments of the present disclosure, the molecular sieves of the catalyst compositions have the CHA structure type. In other embodiments, the molecular sieves have the CHA structure type and are chosen from the group consisting of SSZ-13, SSZ-62, natural chabazite, zeolite K-G, Linde D, Linde R, LZ-218, LZ-235, LZ-236, ZK-14, SAPO-34, SAPO-44, SAPO-47, ZYT-6, and combination thereof.

In certain embodiments, the zeolite of the catalyst compositions comprises a small pore zeolite. A small pore zeolite contains channels defined by up to eight tetrahedral atoms. The phrase "8-ring" zeolite refers to a zeolite having 8-ring pore openings and in some cases the "8-ring" zeolite may also comprise double-six ring secondary building units and may have a cage like structure resulting from the connection of double six-ring building units by 4 rings. Exemplary small pore zeolites include framework types ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, ZON, and mixtures or intergrowths thereof. For example, in certain embodiments, the zeolite comprises a small pore zeolite with a framework type chosen from CHA, LEV, AEI, AFT, AFX, ERI, SFW, KFI, DDR, ITE, and mixtures or intergrowths thereof.

In certain embodiments, the zeolite of the disclosed catalyst compositions comprises a medium pore zeolite. A medium pore zeolite contains channels defined by ten-membered rings. Exemplary medium pore zeolites include framework types AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, SVR, SZR, TER, TON, TUN, UOS, VSV, WEI, WEN, and mixtures or intergrowths thereof. For example, in certain embodiments, the zeolite comprises a medium pore zeolite with a framework type chosen from FER, MEL, MFI, STT, and mixtures or intergrowths thereof.

In certain embodiments, the zeolite of the disclosed catalyst compositions comprises a large pore zeolite. A large pore zeolite contains channels defined by twelve-membered rings. Exemplary large pore zeolites include framework types AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, VET, and mixtures or intergrowths thereof. For example, in certain embodiments, the zeolite comprises a large pore zeolite with a framework type chosen from BEA, FAU, MOR, and mixtures or intergrowths thereof.

As referenced herein above, the disclosed catalyst compositions generally comprise molecular sieves (e.g., zeolites) that are metal-promoted. As used herein, "promoted" refers to a molecular sieve comprising one or more components that are intentionally added, as opposed to comprising impurities that may be inherent in the molecular sieve. Thus, a promoter is a component that is intentionally added to enhance the activity of a catalyst, compared to a catalyst that does not have promoter intentionally added. In order to promote the SCR of oxides of nitrogen, in one or more embodiments, a suitable metal is exchanged into the molecular sieves. Copper participates in the conversion of nitrogen oxides and thus may be a useful metal for exchange. Accordingly, in some embodiments, a catalyst composition is provided which comprises a copper-promoted molecular sieve (e.g., zeolite), e.g., Cu-CHA. However, the disclosure is not intended to be limited thereto, and catalyst compositions comprising other metal-promoted molecular sieves are also encompassed hereby.

Promoter metals can generally be chosen from the group consisting of alkali metals, alkaline earth metals, transition metals in Groups IIIB, IVB, VB, VIB, VIIB, VIIIB, IB, and IIB; Group IIIA elements; Group IVA elements; lanthanides; actinides; and combinations thereof. Certain promoter metals that can, in various embodiments, be used to prepare metal-promoted molecular sieves include, but are not limited to, copper (Cu), cobalt (Co), nickel (Ni), lanthanum (La), manganese (Mn), iron (Fe), vanadium (V), silver (Ag), cerium (Ce), neodymium (Nd), praseodymium (Pr), titanium (Ti), chromium (Cr), zinc (Zn), tin (Sn), niobium (Nb), molybdenum (Mo), hafnium (Hf), yttrium (Y), tungsten (W), and combinations thereof. Combinations of such metals can be employed, e.g., copper and iron, giving a mixed Cu—Fe-promoted molecular sieve, e.g., Cu—Fe-CHA. In certain embodiments, the promoter metal associated with the disclosed zeolite component comprises copper (e.g., as CuO), iron (e.g., as $Fe_2O_3$), or manganese (e.g., as $MnO_2$).

The promoter metal content of a metal-promoted molecular sieve, calculated as the oxide, is, in one or more embodiments, at least about 0.1 wt. %, based on the total weight of the calcined molecular sieve (including promoter) and reported on a volatile-free basis. In some embodiments, the promoter metal of the zeolite component comprises Cu, and the Cu content, calculated as CuO is in the range of about 0.1 wt. % to about 20 wt. %, such as about 0.5 wt. % to about 17 wt. %, about 2 wt. % to about 15 wt. %, and about 2 wt. % to about 10 wt. %, in each case based on the total weight of the calcined molecular sieve reported on a volatile free basis. In some embodiments, the zeolite component (including promoter metal) can be defined by the ratio of promoter metal to aluminum within the promoted zeolite. For example, in some embodiments, the promoter metal to aluminum molar ratio is about 0.1 to about 0.5 (e.g., the Cu/Al ratio is about 0.1 to about 0.5).

In some embodiments, the SCR catalyst composition comprises one or more vanadium-containing components. Such compositions are referred to herein as "vanadia-based compositions." In such embodiments, the vanadium can be in various forms, e.g., including but not limited to, free vanadium, vanadium ion, or vanadium oxides (vanadia), such as vanadium pentoxide ($V_2O_5$). As used herein, "vanadia" or "vanadium oxide" is intended to include any oxide of vanadium, such as vanadium pentoxide. In certain embodiments, a vanadia-based composition comprises a mixed oxide comprising vanadia. The amount of vanadia in the mixed oxide can vary and, in some embodiments, ranges from about 1 to about 10 percent by weight based on the total weight of the mixed oxide. For example, the amount of vanadia can be at least 1 percent, at least 2 percent, at least 3 percent, at least 4 percent, at least 5 percent, or at least 6 percent, with an upper limit of about 10 percent by weight or no more than 10 percent, no more than 9 percent, no more than 8 percent, no more than 7 percent, no more than 6 percent, no more than 5 percent, or no more than 4 percent, with a lower limit of about 1 percent by weight.

Certain useful SCR catalyst compositions comprising vanadium supported on a refractory metal oxide such as alumina, silica, zirconia, titania, ceria, and combinations thereof are described in U.S. Pat. No. 4,010,238 to Shiraishi et al. and U.S. Pat. No. 4,085,193 to Nakajima et al., as well as in U.S. Publ. No. 2017/0341026 to Chen et al., which are incorporated by reference herein in their entireties. In some embodiments, the upstream SCR catalyst composition comprises a mixed oxide comprising vanadia/titania ($V_2O_5$/$TiO_2$), e.g., in the form of titania onto which vanadia has been dispersed. The vanadia/titania can optionally be activated or stabilized with tungsten (e.g., $WO_3$) to provide $V_2O_5$/$TiO_2$/$WO_3$, e.g., in the form of titania onto which $V_2O_5$ and $WO_3$ have been dispersed. It is noted that, in some embodiments, the vanadia is not truly in the form of a mixed metal oxide; rather, the metal oxide components (e.g., titania and vanadia) may be present as discrete particles. The amount of tungsten in such embodiments can vary and can range, e.g., from about 0.5 to about 10 percent by weight based on the total weight of the mixed oxide. For example, the amount of tungsten can be at least 0.5 percent, at least 1 percent, at least 2 percent, at least 3 percent, at least 4 percent, at least 5 percent, or at least 6 percent, with an upper limit of about 10 percent by weight or no more than 10 percent, no more than 9 percent, no more than 8 percent, no more than 7 percent, no more than 6 percent, no more than 5 percent, or no more than 4 percent, with a lower limit of about 0.5 percent by weight.

Exemplary vanadia-based SCR catalyst compositions can comprise components including, but not limited to, $V_2O_5$/$TiO_2$, $V_2O_5$/$WO_3$/$TiO_2$, $V_2O_5$/$WO_3$/$TiO_2$/$SiO_2$, or combinations thereof. Additional vanadium-containing SCR catalyst compositions are described, for example, in U.S. Pat. No. 4,782,039 to Lindsey; U.S. Pat. No. 8,465,713 to Schermanz et al.; and 8,975,206 to Schermanz et al., which are incorporated herein by reference in their entireties.

Certain vanadia-based SCR catalyst compositions can comprise other active components (e.g., other metal oxides). For example, in some embodiments, vanadia-based SCR compositions suitable for use in the disclosed systems comprise vanadia and antimony. Such a vanadia-based SCR composition, in certain embodiments, comprises a composite oxide comprising vanadium and antimony, which can be supported on a refractory metal oxide (e.g., $TiO_2$, $SiO_2$, $WO_3$, $Al_2O_3$, $ZrO_2$, or a combination thereof). Exemplary vanadia-based SCR compositions comprising vanadia and antimony are disclosed in U.S. Pat. No. 4,221,768 to Inoue et al.; and U.S. Publ. Nos. 2018/0304236 to Zhao et al. and 2019/0344247 to Zhao et al., all of which are incorporated herein by reference in their entireties.

Various additional SCR catalyst compositions are also disclosed, for example, in U.S. Pat. No. 7,998,423 to Boorse et al.; U.S. Pat. No. 9,017,626 to Tang et al.; U.S. Pat. No. 9,242,238 to Mohanan et al.; and U.S. Pat. No. 9,352,307 to Stiebels et al., which are incorporated herein by reference. The amount of SCR catalyst used on a substrate can vary, but can be loaded in an amount of about 1-10 g/in$^3$, such as 1-7 g/in$^3$ or 2-5.5 g/in$^3$.

According to the present disclosure, a SCR catalyst composition is generally prepared by providing a metal-promoted molecular sieve material. A molecular sieve having the CHA structure may be prepared according to various techniques known in the art, for example U.S. Pat. No. 4,544,538 to Zones and U.S. Pat. No. 6,709,644 to Zones, as well as U.S. Pat. No. 8,883,119 to Bull et al., which are herein incorporated by reference in their entireties. Methods of preparing other types of molecular sieves are known in the art and can be readily employed to provide the desired zeolite framework for inclusion within the disclosed composition.

To prepare metal-promoted molecular sieves according to various embodiments, a metal (e.g., copper) is ion exchanged into the molecular sieves. Such metals can be ion exchanged into alkali metal or $NH_4$ molecular sieves (which can be prepared by $NH_4^+$ ion exchange into an alkali metal molecular sieve by methods known in the art, e.g., as disclosed in Bleken, F. et al. Topics in Catalysis 2009, 52, 218-228, which is incorporated herein by reference).

Preparation of metal-promoted molecular sieves can comprise an ion-exchange process of the molecular sieves in particulate form with a metal precursor solution. For example, a copper salt can be used to provide copper. When copper acetate is used to provide copper, the copper concentration of the liquid copper solution used in the copper ion-exchange is in some embodiments in the range from about 0.01 molar to about 0.4 molar, for example in the range from about 0.05 molar to about 0.3 molar, in the range from about 0.1 molar to about 0.25 molar, in the range from about 0.125 molar to about 0.25 molar, in the range from about 0.15 molar to about 0.225 molar and at approximately about 0.2. In some embodiments, a metal, such as copper, is ion exchanged into alkali metal or $NH_4^+$-Chabazite to form Cu-Chabazite.

For additional promotion of SCR of oxides of nitrogen, in some embodiments, the molecular sieves can be promoted with two or more metals (e.g., copper in combination with one or more other metals). Where two or more metals are to be included in a metal ion-promoted molecular sieve material, multiple metal precursors (e.g., copper and iron precursors) can be ion-exchanged at the same time or separately, in multiple exchange steps. In certain embodiments, the second metal can be exchanged into a molecular sieve material that has first been promoted with the first metal (e.g., a second metal can be exchanged into a copper-promoted molecular sieve material). The second molecular sieve material can vary and, in some embodiments, may be a transition metal (e.g., iron or manganese) or an alkaline earth or alkali metal.

The SCR catalyst can, in some embodiments, be in the form of an integrated SCR/AMOx catalyst. Exemplary SCR/AMOx catalysts are described, for example, in U.S. Pat. No. 8,524,185 to Caudle et al.; U.S. Pat. No. 8,283,182 to Boorse et al.; and U.S. Pat. No. 5,516,497 to Speronello et al., which are incorporated herein by reference. Suitable SCR/AMOx catalysts may be zoned or layered, such that the SCR catalyst and the AMOx catalyst are at least partially separated. For example, in certain embodiments, an SCR/AMOx catalyst is provided wherein the SCR catalyst is on a substrate having an inlet end and an outlet end, wherein the SCR catalyst is located at the inlet (upstream) end and the AMOx catalyst is located at the outlet (downstream) end. In other embodiments, the SCR/AMOx catalyst may comprise a bottom coat comprising an AMOx catalyst and a top coat with SCR functionality. In some embodiments, the AMOx catalyst composition extends less than the full length of the SCR/AMOx catalyst, and the SCR catalyst composition extends the full length of the SCR/AMOx catalyst (e.g., as the top washcoat). These relative positions advantageously allow the AMOx catalyst to remove slipped ammonia from the SCR catalyst.

Low-Temperature $NO_x$ Adsorber (LT-NA)

A LT-NA component as disclosed herein can comprise a molecular sieve comprising a platinum group metal component. Such LT-NA components can be effective for storing the $NO_x$ at temperatures below 200° C., and releasing the stored NOx at higher temperatures. Any of the molecular sieves described herein could be used in the LT-NA component. In certain embodiments, the molecular sieve may comprise a framework type chosen from CHA (chabazite), FER (ferrierite), AEI, and LEV (levyne). A LT-NA component as disclosed herein can also comprise a metal organic framework (MOF). Such LT-NA components are effective for storing the NOx at temperatures below 200° C. and releasing the stored NOx at a temperature suitable for the downstream SCR catalysts.

The molecular sieve of the LT-NA component may be impregnated with a platinum group metal component. As used herein, reference to impregnation with a platinum group metal component includes all forms of association of the platinum group metal component with the molecular sieve, such as where the platinum group metal component resides either in the ion-exchange sites of the molecular sieve or other internal locations within the molecular sieve, or where the platinum group metal is present on the surface of the molecular sieve, or any combination of the above-noted locations.

The term "platinum group metal component" refers to any component that comprises a platinum group metal (e.g., Ru, Rh, Os, Ir, Pd, Pt). Reference to "platinum group metal component" allows for the presence of the platinum group metal in any valence state. For example, the platinum group metal may be in metallic form, with zero valence, or the platinum group metal may be in an oxide form. The terms "platinum (Pt) component," "rhodium (Rh) component," "palladium (Pd) component," "iridium (Ir) component," "ruthenium (Ru) component," and the like refer to the respective platinum group metal compound, complex, or the like which, upon calcination or use of the catalyst, decomposes or otherwise converts to a catalytically active form, usually the metal or the metal oxide. In some embodiments, the platinum group metal component is palladium as the sole platinum group metal component, although mixtures of platinum group metal components could also be used.

The concentration of the platinum group metal component can vary, but will be, for example, from about 0.01 wt. % to about 6 wt. % relative to the total dry weight of the molecular sieve. The platinum group metal component may be present in the molecular sieve, for example, from about 0.1%, about 0.2%, about 0.5%, about 0.7%, about 0.9%, or about 1.0%, to about 1.5%, about 2.0%, about 2.5%, about 3.0%, about 3.5%, about 4.0%, about 4.5%, about 5.0%, or about 6% by weight, based on the total dry weight of the molecular sieve. Weights of the platinum group metal component are measured and reported as the metal (e.g., weight of palladium). The total dry weight of the molecular sieve includes any added/exchanged metals (i.e., palladium).

Alternatively, the amount of platinum group metal component in the LT-NA composition can be expressed as weight per unit volume of substrate. For example, in certain embodiments, the amount of platinum group metal component in the LT-NA is about 10 g/ft$^3$ to about 140 g/ft$^3$, such as about 40 g/ft$^3$ to about 100 g/ft$^3$ (based on the volume of an underlying substrate upon which the catalyst is disposed).

The LT-NA components are generally present on a substrate at a concentration of, for instance, from about 0.3 g/in$^3$, about 0.4 g/in$^3$, about 0.5 g/in$^3$, about 0.6 g/in$^3$, about 0.7 g/in$^3$, about 0.8 g/in$^3$, about 0.9 g/in$^3$, or about 1.0 g/in$^3$ to about 1.5 g/in$^3$, about 2.0 g/in$^3$, about 2.5 g/in$^3$, about 3.0 g/in$^3$, about 3.5 g/in$^3$, about 4.0 g/in$^3$, about 4.5 g/in$^3$, about 5.0 g/in$^3$, or about 5.5 g/in$^3$, based on the volume of the substrate.

The LT-NA component as disclosed herein may be readily prepared by processes well known in the art. The disclosed LT-NA component may, in some embodiments, be prepared via an incipient wetness impregnation method. For example, a metal precursor (e.g., a platinum group metal component) maybe dissolved in an aqueous or organic solution and then the metal-containing solution is added to the material to be impregnated (e.g., molecular sieve), and which contains essentially the same pore volume as the volume of the solution that was added. Capillary action draws the solution into the pores of the material. Solution added in excess of the material pore volume causes the solution transport to change from a capillary action process to a diffusion process, which is much slower. The impregnated material can then be dried and optionally calcined to remove the volatile components within the solution, depositing the metal on the surface of the material. The maximum loading is limited by the solubility of the precursor in the solution. The concentration profile of the impregnated material depends on the mass transfer conditions within the pores during impregnation and drying.

For example, a platinum group metal component precursor (such as, for example, palladium nitrate) may be supported on the molecular sieve by impregnation, adsorption, ion-exchange, incipient wetness, precipitation, or the like. Non-limiting examples of suitable PGM precursors include palladium nitrate, tetraammine palladium nitrate, tetraammine platinum acetate, and platinum nitrate. Alternatively, a platinum group metal colloidal dispersions as discussed below could be used. During the calcination steps, or at least during the initial phase of use of the catalyst, such compounds are converted into a catalytically active form of the metal or a compound thereof.

Low-Temperature NH$_3$ Adsorber (LT-AA)

A LT-AA component as disclosed herein can comprise a molecular sieve. Such LT-AA components are effective for storing the NH$_3$ at temperatures below 200° C., and releasing the stored NH$_3$ at higher temperatures when the SCR catalyst becomes functional. Any of the molecular sieves described herein could be used in the LT-AA component. In certain embodiments, the LT-AA component is a zeolite, which can be a natural or synthetic, such as faujasite, chabazite, clinoptilolite, mordenite, silicalite, zeolite X, zeolite Y, ultrastable zeolite Y, ZSM-5 zeolite, offretite, or a beta zeolite. An example beta zeolite that can be used is disclosed in U.S. Pat. No. 6,171,556 to Burk et al., which is incorporated herein by reference in its entirety. When present, the LT-AA components are, for example, used in an amount of about 0.05 g/in$^3$ to about 1 g/in$^3$. A LT-AA component as disclosed herein can also comprise a metal organic framework (MOF). Such LT-AA components are effective for storing the ammonia at temperatures below 200° C., and releasing the stored NO$_x$ at a temperature suitable for the downstream SCR catalysts. In certain embodiments, the LT-AA component can be characterized as substantially free of catalytic metal, such as platinum group metal components.

Low-Temperature Water Vapor Adsorber (LT-WA)

A LT-WA component as disclosed herein may comprise a desiccant material that is thermally stable at typical operating conditions of ammonia-fueled engines. Such LT-WA components are effective for storing H$_2$O at temperatures below 150° C., and releasing the stored H$_2$O at higher temperatures. Any of the molecular sieves described herein could be used in the LT-WA component. Alternatively, silica, activated charcoal, activated alumina, clay materials (e.g., montmorillonite), calcium sulfate, or calcium chloride could be used. When present, the LT-WA components are for example used in an amount of about 0.05 g/in$^3$ to about 3 g/in$^3$. In certain embodiments, the LT-WA component can be characterized as substantially free of catalytic metal, such as platinum group metal components. A LT-WA component as disclosed herein can also comprise a metal organic framework (MOF).

Oxidation Catalyst

The oxidation catalyst component of the emission treatment system can be a diesel oxidation catalyst (DOC) or an ammonia oxidation catalyst (AMOx).

A DOC is suitable for example to oxidize NOx and/or CO and/or HC components of exhaust gas. In a DOC, unburned gaseous and nonvolatile hydrocarbons and carbon monoxide are largely combusted to form carbon dioxide and water. In addition, a proportion of the NOx of the NOx component may be oxidized to $NO_2$. DOC catalysts are taught, for instance, in U.S. Publ. No. 2019/0015781 to Wei et al., which is incorporated by reference herein. A DOC may be a formed in a single layer or multiple layers. Suitable DOC compositions advantageously comprise one or more platinum group metal impregnated on a porous refractory metal oxide support, as disclosed herein. Suitable DOC compositions may further comprise one or more non-PGM transition metal, such as Mn, or alkaline earth metal, such as Ba, impregnated on a porous refractory metal oxide support, as disclosed herein. The DOC may be coated on a flow-through monolith substrate or a wall-flow filter substrate as described herein. The DOC is typically located upstream from the SCR, and can be optionally placed after a close-coupled SCR.

The DOC is advantageously in a close-coupled position. A close-coupled position is, for instance, within about 12 inches (in) from the exhaust manifold (i.e., where individual cylinder exhaust pipes join together). In some embodiments, the distance from the exhaust manifold to the upstream end of the DOC unit is from about 0.5 in to about 12 inches. In some embodiments, the distance is about 0.5 in, about 1 in, about 2 in, about 3 in, about 4 in, about 5 in, about 6 in, about 7 in, about 8 in, about 9 in, about 10 in, about 11 in or about 12 in. In some embodiments, the 5 distance is from about 0.5 in, from about 1 in, from about 2 in, from about 3 in, from about 4 in or from about 5 in to about 6 in, to about 7 in, to about 8 in, to about 9 in, to about 10 in, to about 11 in or to about 12 in, with each combination of lower endpoint and upper endpoint explicitly defining a range that is contemplated as an embodiment of the invention.

Ammonia oxidation (AMOx) generally refers to a process in which $NH_3$ is reacted with oxygen to produce NO, $NO_2$, $N_2O$, or $N_2$. An AMOx catalyst used in the present disclosure can comprise a platinum group metal component impregnated on a porous refractory metal oxide support. The AMOx catalyst can further comprise hydrocarbon adsorbents, such as zeolites (e.g., Fe-Beta zeolites), and/or stabilizers or promoters (e.g., barium oxide). AMOx catalysts are taught, for instance, in U.S. Pat. Appl. Pub. No. 2011/0271664 to Boorse et al., which is incorporated herein by reference. An AMOx catalyst is typically located downstream of the SCR.

As used herein, "platinum group metal" refers to platinum group metals or oxides thereof, including platinum (Pt), palladium (Pd), ruthenium (Ru), rhodium (Rh), osmium (Os), iridium (Jr), and mixtures thereof. In certain embodiments, the platinum group metal comprises a combination of platinum and palladium, such as in a weight ratio of about 1:10 to about 10:1, such as equal to or greater than about 1.5:1, equal to or greater than about 2:1, or equal to or greater than about 5:1. The concentrations of platinum group metal component (e.g., Pt, Pd, or a mixtures thereof) can vary, but will be, for example, from about 0.1 wt. % to about 10 wt. % relative to the weight of the porous refractory oxide support material (e.g., about 1 wt. % to about 6 wt. % relative to the refractory oxide support).

As used herein, "porous refractory metal oxide" refers to porous metal-containing oxide materials exhibiting chemical and physical stability at high temperatures, such as the temperatures associated with diesel engine exhaust. Exemplary refractory oxides include alumina, silica, zirconia, titania, ceria, and combinations thereof. Combinations may be in the form of physical or chemical mixtures. Exemplary refractory oxides include atomically-doped combinations and including high surface area or activated compounds such as activated alumina. Exemplary combinations of metal oxides include alumina-zirconia, ceria-zirconia, alumina-ceria-zirconia, lanthana-alumina, lanthana-zirconia-alumina, baria-alumina, baria lanthana-alumina, baria lanthana-neodymia alumina, and alumina-ceria. Exemplary aluminas include large pore boehmite, gamma-alumina, and delta/theta alumina. Useful commercial aluminas include activated aluminas, such as high bulk density gamma-alumina, low or medium bulk density large pore gamma-alumina, and low bulk density large pore boehmite and gamma-alumina.

High surface area refractory oxide supports, such as alumina support materials, also referred to as "gamma alumina" or "activated alumina," can exhibit a BET surface area in excess of 60 $m^2/g$, often up to about 200 $m^2/g$ or higher. Such activated alumina is usually a mixture of the gamma and delta phases of alumina, but may also contain substantial amounts of eta, kappa and theta alumina phases. "BET surface area" has its usual meaning of referring to the Brunauer, Emmett, Teller method for determining surface area by $N_2$ adsorption. Desirably, the active alumina has a specific surface area of 60 $m^2/g$ to 350 $m^2/g$, such as 90 $m^2/g$ to 250 $m^2/g$.

The amount of platinum group metal can vary, but in certain embodiments, the amount of platinum group metal is about 10 $g/ft^3$ to 100 $g/ft^3$ (based on the volume of an underlying substrate upon which the catalyst is disposed), including ranges such as at least about 40 $g/ft^3$, at least about 45 $g/ft^3$, at least about 50 $g/ft^3$, at least about 55 $g/ft^3$, at least about 60 $g/ft^3$, at least about 65 $g/ft^3$, at least about 70 $g/ft^3$, at least about 75 $g/ft^3$, or at least about 80 $g/ft^3$. Concentration of platinum group metal, or any other composition, on a substrate refers to concentration per any one three-dimensional section or zone, for instance any cross-section of a substrate or of the entire substrate, and is typically expressed as $g/ft^3$ or $g/in^3$.

In some embodiments, the overall oxidation catalyst composition is present on a substrate at a concentration of, for instance, from about 0.3 $g/in^3$, about 0.4 $g/in^3$, about 0.5 $g/in^3$, about 0.6 $g/in^3$, about 0.7 $g/in^3$, about 0.8 $g/in^3$, about 0.9 $g/in^3$, or about 1.0 $g/in^3$ to about 1.5 $g/in^3$, about 1.7 $g/in^3$, about 1.8 $g/in^3$, about 1.9 $g/in^3$, about 2.0 $g/in^3$, about 2.1 $g/in^3$, about 2.2 $g/in^3$, about 2.3 $g/in^3$, or about 2.5 $g/in^3$, based on the volume of the substrate.

Preparation of the platinum group metal-impregnated refractory oxide material can comprise impregnating the refractory oxide support material in particulate form with a platinum group metal solution, such as one or more of a platinum solution and a palladium solution. Multiple platinum group metal components (e.g., platinum and palladium) can be impregnated at the same time or separately, and can be impregnated on the same support particles or separate support particles using an incipient wetness technique. The support particles may be dry enough to absorb substantially all of the solution to form a moist solid. Aqueous solutions of water soluble compounds or complexes of the platinum group metal component can be utilized, such as palladium or platinum nitrate, tetraammine palladium or platinum nitrate, or tetraammine palladium, or platinum acetate.

Following treatment of the support particles with the platinum group metal solution, the particles are dried, such as by heat treating the particles at elevated temperature (e.g., 100-150° C.) for a period of time (e.g., 1-3 hours), and then calcining to convert the platinum group metal components to a more catalytically active form. An exemplary calcination process involves heat treatment in air at a temperature of about 400-550° C. for 1-3 hours. The above process can be repeated as needed to reach the desired level of platinum group metal impregnation. The resulting material can be stored as a dry powder or in slurry form.

Alternatively, platinum group metal starting materials can be in the form of a colloidal dispersion of platinum group metal nanoparticles rather than in solution form. Such colloidal suspensions can be applied to a support in an incipient wetness technique as described above. Methods of impregnating supports with colloidal platinum group metal materials are described in U.S. Publ. Nos. 2017/0304805 to Xu et al. and 2019/0015781 to Wei et al., both of which are incorporated by reference herein in their entirety.

Substrates

The emission treatment components can be disposed on a substrate. Useful substrates may be 3-dimensional, having a length and a diameter and a volume, similar to a cylinder. The shape does not necessarily have to conform to a cylinder. The length is an axial length defined by an inlet end and an outlet end.

According to one or more embodiments, the substrate for the disclosed component(s) may be constructed of any material typically used for preparing automotive catalysts and can comprise a metal or ceramic honeycomb structure. The substrate provides a plurality of wall surfaces upon which the washcoat composition is applied and adhered, thereby acting as a substrate for the catalyst composition. In some embodiments, the substrate comprises a honeycomb substrate in the form of a wall-flow filter or a flow-through substrate.

Ceramic substrates may be made of any suitable refractory material, e.g. cordierite, cordierite-α-alumina, aluminum titanate, silicon titanate, silicon carbide, silicon nitride, zircon mullite, spodumene, alumina-silica-magnesia, zircon silicate, sillimanite, a magnesium silicate, zircon, petalite, α-alumina, an aluminosilicate, and the like.

Substrates may also be metallic, comprising one or more metals or metal alloys. A metallic substrate may include any metallic substrate, such as those with openings or "punch-outs" in the channel walls. The metallic substrates may be employed in various shapes such as pellets, corrugated sheet, or monolithic foam. Examples of metallic substrates include heat-resistant, base-metal alloys, especially those in which iron is a substantial or major component. Such alloys may contain one or more of nickel, chromium, and aluminum, and the total of these metals may advantageously comprise at least about 15 wt % (weight percent) of the alloy, for instance, about 10 wt % to about 25 wt % chromium, about 1 wt % to about 8 wt % of aluminum, and from 0 wt % to about 20 wt % of nickel, in each case based on the weight of the substrate. Examples of metallic substrates include those having straight channels; those having protruding blades along the axial channels to disrupt gas flow and to open communication of gas flow between channels; and those having blades and also holes to enhance gas transport between channels allowing for radial gas transport throughout the monolith. Metallic substrates may be advantageously employed in certain embodiments in a close-coupled position, allowing for fast heat-up of the substrate and, correspondingly, fast heat up of a catalyst composition coated therein.

Any suitable substrate for the articles disclosed herein may be employed, such as a monolithic substrate of the type having fine, parallel gas flow passages extending there through from an inlet or an outlet face of the substrate such that passages are open to fluid flow there through ("flow-through substrate"). Another suitable substrate is of the type have a plurality of fine, substantially parallel gas flow passages extending along the longitudinal axis of the substrate where each passage may be blocked at one end of the substrate body, with alternate passages blocked at opposite end-faces ("wall-flow filter"). Flow-through and wall-flow substrates are also taught, for example, in U.S. Publ. Nos. 2017/0333883 to Mohanan et al., which is incorporated herein by reference in its entirety.

Flow-Through Substrates

In some embodiments, the substrate is a flow-through substrate (e.g., a monolithic flow-through substrate, including a monolithic flow-through honeycomb substrate). Flow-through substrates have fine, parallel gas flow passages extending from an inlet end to an outlet end of the substrate such that passages are open to fluid flow. The passages, which are essentially straight paths from their fluid inlet to their fluid outlet, are defined by walls on which a coating (e.g., a catalytic coating) is disposed so that gases flowing through the passages contact the coating material. The flow passages of the flow-through substrate are thin-walled channels, which can be of any suitable cross-sectional shape and size such as trapezoidal, rectangular, square, sinusoidal, hexagonal, oval, circular, etc. The flow-through substrate can be ceramic or metallic as described above.

Flow-through substrates can, for example, have a volume of from about 50 in$^3$ to about 1200 in$^3$, a cell density (inlet openings) of from about 60 cells per square inch (cpsi) to about 500 cpsi or up to about 900 cpsi, for example from about 200 cpsi to about 400 cpsi and a wall thickness of from about 50 microns to about 200 microns or about 400 microns.

FIGS. 1A and 1B illustrate an exemplary substrate 2 in the form of a flow-through substrate coated with a coating composition as described herein. Referring to FIG. 1A, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 1B, flow passages 10 are formed by walls 12 and extend through carrier 2 from upstream end face 6 to downstream end face 8, the passages 10 being unobstructed so as to permit the flow of a fluid, e.g., a gas stream, longitudinally through substrate 2 via flow passages 10 thereof. As more easily seen in FIG. 1B, walls 12 are so dimensioned and configured that flow passages 10 have a substantially regular polygonal shape. As shown, coating compositions can be applied in multiple, distinct layers if desired. In the illustrated embodiment, a coating composition consists of both a discrete bottom layer 14 (e.g., a LT-NA component) adhered to the walls 12 of the carrier member and a second discrete top layer 16 (e.g., an LT-WA component) coated over the bottom layer 14. The present disclosure can be practiced with one or more (e.g., two, three, or four or more) composition layers and is not limited to the two-layer embodiment illustrated in FIG. 1B.

Wall-Flow Filter Substrates

In some embodiments, the substrate is a wall-flow filter, which has a plurality of fine, substantially parallel gas flow passages extending along the longitudinal axis of the substrate. Each passage may be blocked at one end of the substrate body, with alternate passages blocked at opposite end-faces. Such monolithic wall-flow filter substrates may contain up to about 900 or more flow passages (or "cells") per square inch of cross-section, although far fewer may be used. For example, the substrate may have from about 7 to 600, more usually from about 100 to 400, cells per square inch ("cpsi"). The cells can have cross-sections that are rectangular, square, circular, oval, triangular, hexagonal, or are of other polygonal shapes.

A cross-section view of a monolithic wall-flow filter substrate section is illustrated in FIG. 2, showing alternating blocked/plugged and open passages (cells). Blocked or plugged ends 100 alternate with open passages 101, with each opposing end open and blocked, respectively. The filter has an inlet end 102 and outlet end 103. The arrows crossing porous cell walls 104 represent exhaust gas flow entering the open cell ends, diffusing through the porous cell walls 104 and exiting the open outlet cell ends. Plugged ends 100 prevent gas flow and encourage diffusion through the cell walls. Each cell wall will have an inlet side 104a and outlet side 104b. The passages are enclosed by the cell walls.

The wall-flow filter article substrate may have a volume of, for instance, from about 50 cm$^3$, about 100 cm$^3$, about 200 cm$^3$, about 300 cm$^3$, about 400 cm$^3$, about 500 cm$^3$, about 600 cm$^3$, about 700 cm$^3$, about 800 cm$^3$, about 900 cm$^3$, or about 1000 cm$^3$ to about 1500 cm$^3$, about 2000 cm$^3$, about 2500 cm$^3$, about 3000 cm$^3$, about 3500 cm$^3$, about 4000 cm$^3$, about 4500 cm$^3$, or about 5000 cm$^3$. Wall-flow filter substrates can have a wall thickness from about 50 microns to about 2000 microns, for example from about 50 microns to about 450 microns or from about 150 microns to about 400 microns.

The walls of the wall-flow filter are porous and may have a wall porosity of at least about 50% or at least about 60% with an average pore size of at least about 5 microns prior to disposition of the functional coating. For instance, the wall-flow filter substrate in some embodiments will have a porosity of >50%, >60%, >65%, or >70%. For instance, the wall-flow filter article substrate will have a wall porosity of from about 50%, about 60%, about 65%, or about 70% to about 75%, about 80%, or about 85% and an average pore size of from about 5 microns, about 10 microns, about 20 microns, about 30 microns, about 40 microns, or about 50 microns to about 60 microns, about 70 microns, about 80 microns, about 90 microns, or about 100 microns prior to disposition of a catalytic coating. The terms "wall porosity" and "substrate porosity" are interchangeable. Porosity is the ratio of void volume divided by the total volume of a substrate. Pore size may be determined according to ISO15901-2 (static volumetric) procedure for nitrogen pore size analysis. Nitrogen pore size may be determined on Micromeritics TRISTAR 3000 series instruments. Nitrogen pore size may be determined using BJH (Barrett-Joyner-Halenda) calculations and 33 desorption points. Useful wall-flow filters have high porosity, allowing high loadings of catalyst compositions without excessive backpressure during operation.

Coatings

The compositions as disclosed herein are coated on a substrate, such as the substrates noted herein. The coatings may comprise one or more thin, adherent coating layers disposed on and in adherence to least a portion of a substrate. The coatings may be on the substrate wall surfaces and/or in the pores of the substrate walls, that is "in" and/or "on" the substrate walls. Thus, the phrase "a coating disposed on the substrate" means on any surface, for example on a wall surface and/or on a pore surface.

The compositions are can be applied in the form of a washcoat. A washcoat is formed by preparing a slurry containing a specified solids content (e.g., about 10% to about 60% by weight) in a liquid vehicle, which is then applied to a substrate and dried and calcined to provide a coating layer. If multiple coating layers are applied, the substrate can be dried and calcined after each layer is applied and/or after the number of desired multiple layers are applied.

The washcoat slurries may optionally contain a binder (e.g., alumina, silica), water-soluble or water-dispersible stabilizers, promoters, associative thickeners, and/or surfactants (including anionic, cationic, non-ionic or amphoteric surfactants). For example, a washcoat can comprise a $ZrO_2$ binder derived from a suitable precursor such as zirconyl acetate, zirconium acetate, or any other suitable zirconium precursor such as zirconyl nitrate, and zirconium nitrate. Zirconyl acetate binder provides a coating that remains homogeneous and intact after thermal aging. Other potentially suitable binders include, but are not limited to, alumina and silica. Alumina binders include aluminum oxides, aluminum hydroxides and aluminum oxyhydroxides. Aluminum salts and colloidal forms of alumina many also be used. Silica binders include various forms of $SiO_2$, including silicates and colloidal silica. Binder compositions may comprise any combination of zirconia, alumina and silica. When present, the binder can be used in an amount of about 1-5 wt % of the total washcoat loading.

The pH range for the slurry can be about 3 to about 6. Addition of acidic or basic species to the slurry can be carried out to adjust the pH accordingly. For example, in some embodiments, the pH of the slurry is adjusted by the addition of ammonium hydroxide or aqueous nitric acid.

The slurry can be milled to enhance mixing of the particles and formation of a homogenous material. The milling can be accomplished in a ball mill, continuous mill, or other similar equipment, and the solids content of the slurry may be, e.g., about 20-60 wt %, such as about 20-40 wt %. In one embodiment, the post-milling slurry is characterized by a D90 particle size of about 10 microns to about 40 microns, such as about 10 microns to about 30 microns or about 10 microns to about 15 microns.

The slurry is then coated on the substrate using any washcoat technique known in the art. In one embodiment, the substrate is dipped one or more times in the slurry or otherwise coated with the slurry. Thereafter, the coated substrate is dried at an elevated temperature (e.g., 100-150° C.) for a period of time (e.g., 10 min-3 hours) and then calcined by heating, e.g., at 400-600° C., for about 10 minutes to about 3 hours. Following drying and calcining, the final washcoat coating layer can be viewed as essentially solvent-free.

After calcining, the washcoat loading obtained by the above described washcoat technique can be determined through calculation of the difference in coated and uncoated weights of the substrate. As will be apparent to those of skill in the art, the loading can be modified by altering the slurry rheology. In addition, the coating/drying/calcining process to generate a washcoat can be repeated as needed to build the coating to the desired loading level or thickness, meaning more than one washcoat may be applied.

The washcoat(s) can be applied such that different coating layers may be in direct contact with the substrate. Alternatively, one or more "undercoats" may be present, so that at least a portion of a catalytic or sorbent coating layer or coating layers are not in direct contact with the substrate (but rather, are in contact with the undercoat). One or more "overcoats" may also be present, so that at least a portion of the coating layer or layers are not directly exposed to a gaseous stream or atmosphere (but rather, are in contact with the overcoat).

Different coating layers may be in direct contact with each other. Alternatively, different coating layers may not be in direct contact. Various coating layers can be viewed as an undercoat, an overcoat, or an interlayer. An undercoat is a layer "under" a coating layer, an overcoat is a layer "over" a coating layer and an interlayer is a layer "between" two coating layers. The interlayer(s), undercoat(s) and overcoat(s) may contain one or more functional compositions or may be free of functional compositions.

The various coatings may advantageously be "zoned", comprising zoned layers. This may also be described as "laterally zoned". For example, a layer may extend from the inlet end towards the outlet end extending about 10%, about 20%, about 30%, about 40%, about 50%, about 60%, about 70%, about 80%, or about 90% of the substrate length. Another layer may extend from the outlet end towards the inlet end extending about 10%, about 20%, about 30%, about 40%, about 50%, about 60%, about 70%, about 80%, or about 90% of the substrate length. Different coating layers may be adjacent to each other and not overlay each other. Alternatively, different layers may overlay a portion of each other, providing a third "middle" zone. The middle zone may, for example, extend from about 5% to about 80% of the substrate length, for example about 5%, about 10%, about 20%, about 30%, about 40%, about 50%, about 60%, or about 70% of the substrate length.

Methods for Treating Exhaust Stream

In another aspect is provided a method for treating a gaseous exhaust stream comprising a mixture of nitrogen oxides ($NO_x$) flowing from the exhaust manifold of an ammonia-fueled engine, such as for NOx abatement. In some embodiments, such methods may be effective to not only abate $NO_x$ emissions associated with such engines, but also to adsorb certain gaseous components of exhaust streams emitted by such engines in order to enhance the effectiveness of the system. For example, the method comprises contacting the gaseous exhaust stream with an SCR catalyst and one or more adsorption components positioned upstream of the SCR catalyst, the adsorption component being chosen from the group consisting of low temperature $NO_x$ adsorbers (LT-NA), low temperature ammonia adsorbers (LT-AA), low temperature water vapor adsorbers (LT-WA), and combinations thereof. The method may further comprise treating the exhaust stream with one or more oxidation catalysts, such as an AMOx catalyst, typically positioned downstream of the SCR catalyst.

In some embodiments, the LT-NA component is effective for releasing one or both of NOx and $NO_2$ at a temperature above about 300° C. In some embodiments, the LT-NA component is effective for releasing one or both of NOx and $NO_2$ at a temperature above about 325° C.

The present compositions, components, systems, and methods are suitable for treatment of exhaust gas streams from mobile emissions sources such as trucks and automobiles. The present compositions, components, systems, and methods are also suitable for treatment of exhaust gas streams from stationary sources such as power plants.

It will be readily apparent to one of ordinary skill in the relevant arts that suitable modifications and adaptations to the compositions, components, systems, and methods described herein can be made without departing from the scope of any embodiments or aspects thereof. The compositions, components, systems, and methods provided are exemplary and are not intended to limit the scope of the claimed embodiments. All of the various embodiments, aspects, and options disclosed herein can be combined in all variations. The scope of the compositions, components, systems, and methods described herein comprise all actual or potential combinations of embodiments, aspects, options, examples, and preferences herein. All patents and publications cited herein are incorporated by reference herein for the specific teachings thereof as noted, unless other specific statements of incorporation are specifically provided

EXAMPLES

The following examples are intended to be illustrative and are not meant to in any way to limit the scope of the disclosure.

Example 1: DOC Article

A bottom coat catalyst slurry containing milled alumina powder impregnated with Pd (0.5 wt. %), Ba (0.8 wt. %), and Pt (0.3 wt. %) was prepared and adjusted to a pH of 4.5 to 5.0 with nitric acid. The bottom coat slurry had a solid content of 38 wt. %. A topcoat slurry containing alumina, Mn (5 wt. %), and Pt-amine (3.3 wt. %) was prepared, milled, and adjusted to a pH of 4.5 to 5.0 with nitric acid. The topcoat slurry had a solid concentration of 37 wt. %. Zeolite beta (0.35 $g/in^3$) was added to the topcoat slurry.

The bottom coat slurry was applied to the entire core length of a 1"×3", 400 cpsi (cells per square inch) honeycomb substrate via a washcoat technique. The coated substrate was air dried at 120° C. and calcined at 500° C. for 1 hour, providing a coating loading of 1.6 $g/in^3$. The top coat slurry was applied over the entire bottom coat and was dried and calcined as the bottom coat, to provide a total coating loading of 2.5 $g/in^3$ and a Pt/Pd weight ratio of 3/1.

Example 2: LT-NA-DOC Article (NOx Adsorber-Containing DOC, Zone-Design)

The article comprised a zoned design, where the entire core length of a 1"×3", 400 cpsi (cells per square inch) honeycomb substrate was coated with a Pd/Ferrierite (FER) bottom coat containing a PGM (platinum group metal) loading of 120 $g/ft^3$ and a Pt/Pd weight ratio of 0/1, to serve as the NOx adsorber (LT-NA). The rear half of the substrate was coated with a DOC topcoat containing of a mixture of 5 wt. % Mn on alumina support and 5 wt. % Si on alumina support (1.4 $g/in^3$), the mixture impregnated with Pt and Pd (a Pt/Pd weight ratio of 9/1, with a PGM loading of 80 $g/ft^3$), and a HC-trap molecular sieve, 2 wt. % Fe/Beta (0.7 $g/in^3$). The total PGM loading of this LT-NA-DOC was 160 $g/ft^3$ with a Pt/Pd distribution of 36/124.

Example 3: LT-NA-DOC Article (NOx Adsorber-Containing DOC, Layering-Design)

The article comprised a layered design, distinct from Example 2, where the entire core length of a 1"×3", 400 cpsi (cells per square inch) honeycomb substrate was coated with LT-NA-DOC article consisting of a Pd/Ferrierite (FER)

bottom coat with a PGM loading of 80 g/ft³, to serve as a NOx adsorber (LT-NA). A DOC topcoat consisted of a mixture of 5 wt. % Mn on alumina support and 5 wt. % Si on alumina support (1.4 g/in³), the mixture impregnated with Pt and Pd (a Pt/Pd weight ratio of 9/1, with a PGM loading of 60 g/ft³). The total PGM loading of this LT-NA-DOC was 140 g/ft³, with a Pt/Pd distribution of 54/86.

Example 4: Selective Catalytic Reduction on Filter (SCRoF) Article

A catalyst slurry containing milled Cu/CHA (3.3 wt. % Cu) and 5 wt. % zirconium acetate binder was prepared and applied via a washcoat technique to a 300/12, 1" diameter× 5.5" length honeycomb substrate filter with alternate channel openings having a volume of 70.8 cm³. The coated core was dried at 130° C. and calcined at 550° C. for 1 hour to provide a coating loading of 1.75 g/in³.

Example 5: Pollution Abatement

The coated DOC article of Example 1 was hydrothermally aged in a tube furnace at 800° C. for 16 hours with a feed gas composition of 10% $H_2O$, 10% $O_2$, and balance $N_2$. The coated LT-NA-DOC articles of Example 2 and Example 3 were hydrothermally aged in a tube furnace at 800° C. for 16 hours and at 750° C. for 25 hours, respectively, with a feed gas composition of 10% $H_2O$, 10% $O_2$, and balance $N_2$. The SCR article was also hydrothermally aged in a tube furnace at 750° C. for 16 hours with a feed gas composition of 10% $H_2O$, 10% $O_2$, and balance $N_2$. Samples were evaluated in a lab reactor as a system of DOC+SCR or LT-NA-DOC+SCR, where the SCR article is installed downstream of the DOC or LT-NA-DOC article. The lab reactor was equipped to conduct a simulated WLTC (Worldwide Harmonized Light-Duty Vehicles Test Cycle) where engine out emissions of THC, CO, and $NO_x$ can be recreated with dynamic temperature and flow traces on a 1 Hz basis. $NH_3$ was injected prior to the SCR article at $NH_3/NO_x$ ratio=1 on a second-by-second basis. Two sampling lines were installed in the lab reactor to measure the effectiveness of proposed exhaust gas treatment system for the $NH_3$-fueled scenarios. One sampling line was taken between the DOC or LT-NA-DOC article and the SCR article, and a second sampling line was taken after the combined system.

Three experiments were conducted to measure the effectiveness of the proposed exhaust gas treatment system for the $NH_3$-fueled vehicles.

Experiment 1. A base-line was established using traditional diesel vehicle emissions with the emission treatment system composed of the DOC article of Examples 1 and 2, either alone or in combination with the SCR article of Example 4.

Experiment 2. The catalyst system composed of the DOC or LT-NA-DOC article of Examples 1 and 3, either alone or in combination with the SCR article of Example 4, were used for the treatment of simulated $NH_3$-fueled vehicle emissions that do not contain $HC/CO/NO_2/CO_2$ in the exhaust feed. It was assumed that $NH_3$-fuel has the same burning efficiency as diesel.

Experiment 3. The catalyst systems of Experiment 2 were used for the treatment of simulated $NH_3$-fueled vehicle emissions with a higher amount of $NO_x$ in the exhaust gas. Additional $NH_3$ fuel was used in the cylinder to generate the same heating efficiency as diesel because $NH_3$ has a lower heating value compared to diesel on a volume basis.

In order to provide an understanding of the experiments, reference is made to the appended figures. The disclosure described herein is illustrated by way of example and not by way of limitation in the accompanying figures.

Figure 4:
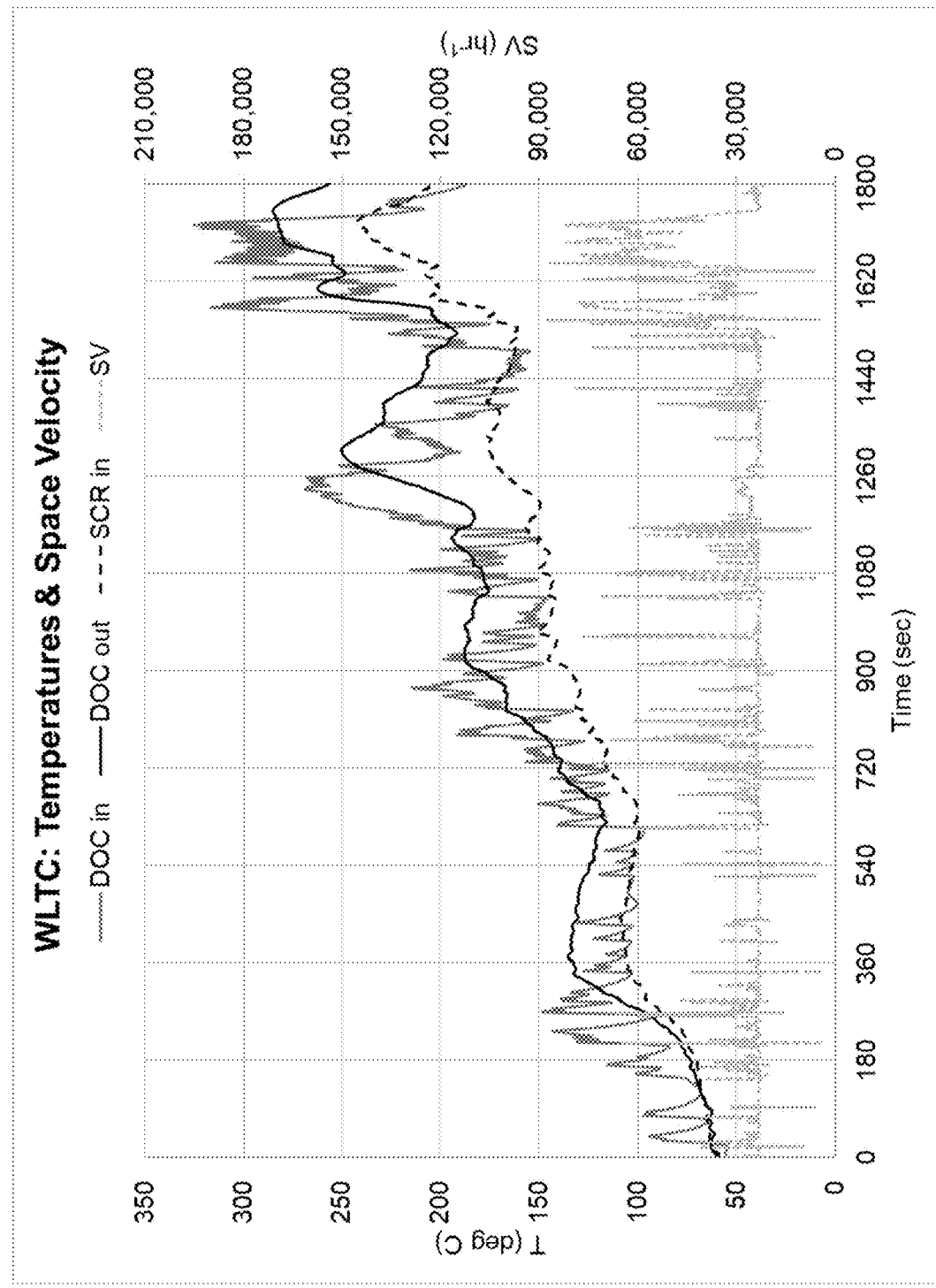
FIG. 4 depicts temperature traces of DOC inlet, DOC outlet, SCR inlet, and SV under various scenarios for one exemplary embodiment of an exhaust treatment system of the present disclosure.

FIG. 4 depicts temperature traces for the inlet of the DOC, after the DOC, before the SCR, and space velocity (SV) that simulate various vehicle exhausts (including the diesel exhaust of Experiment 1) for systems comprising the DOC article of Example 1 in combination with the SCR article of Example 4. The averages of three replicates are depicted.

Figure 5:
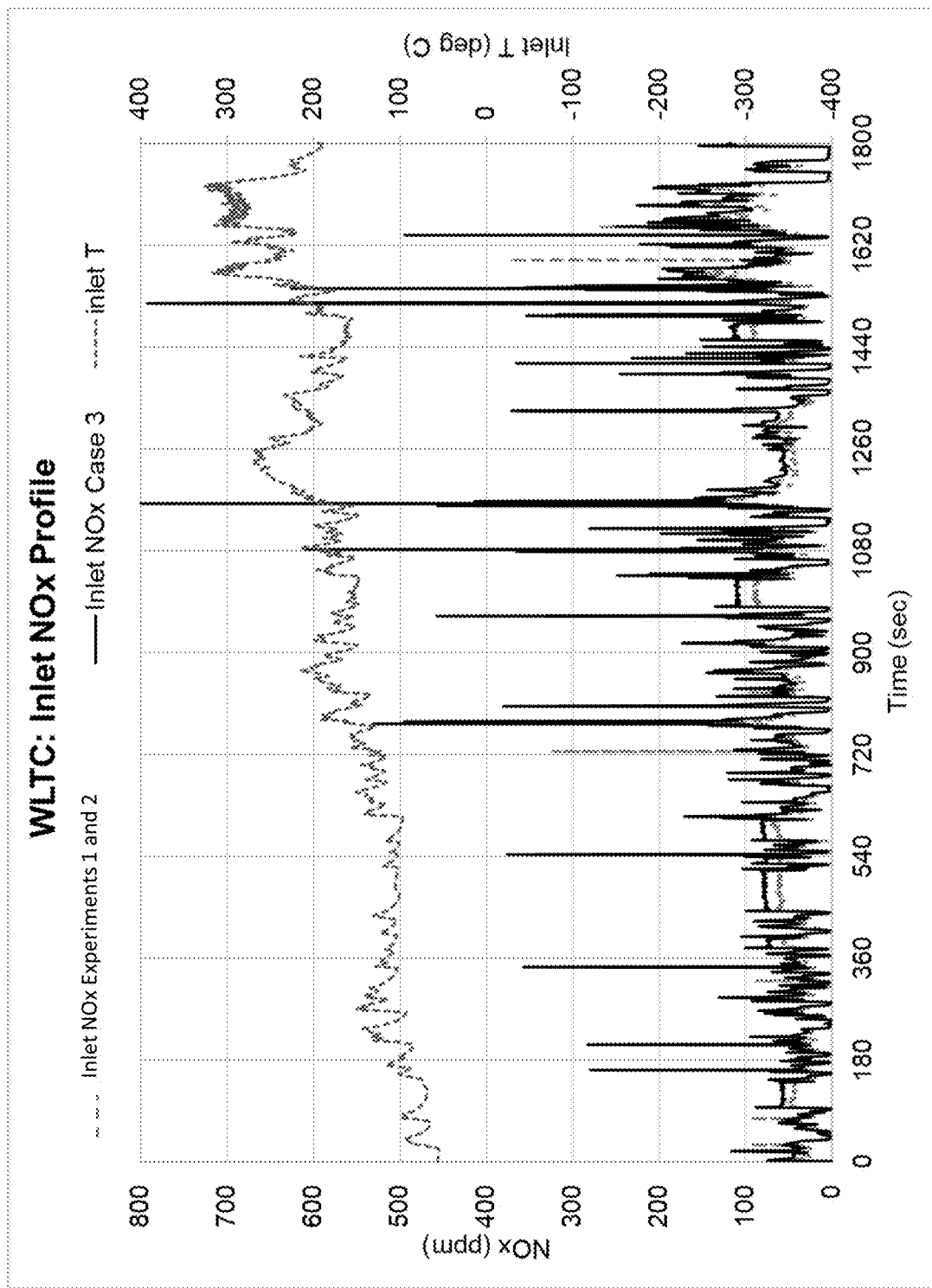
FIG. 5 depicts inlet NOx traces for the exemplary embodiment of FIG. 4.

FIG. 5 depicts the inlet $NO_x$ profile for the experiments for exhaust treatment systems comprising the DOC article of Example 1 in combination with the SCR article of Example 4. The averages of three replicates are depicted.

Figure 6:
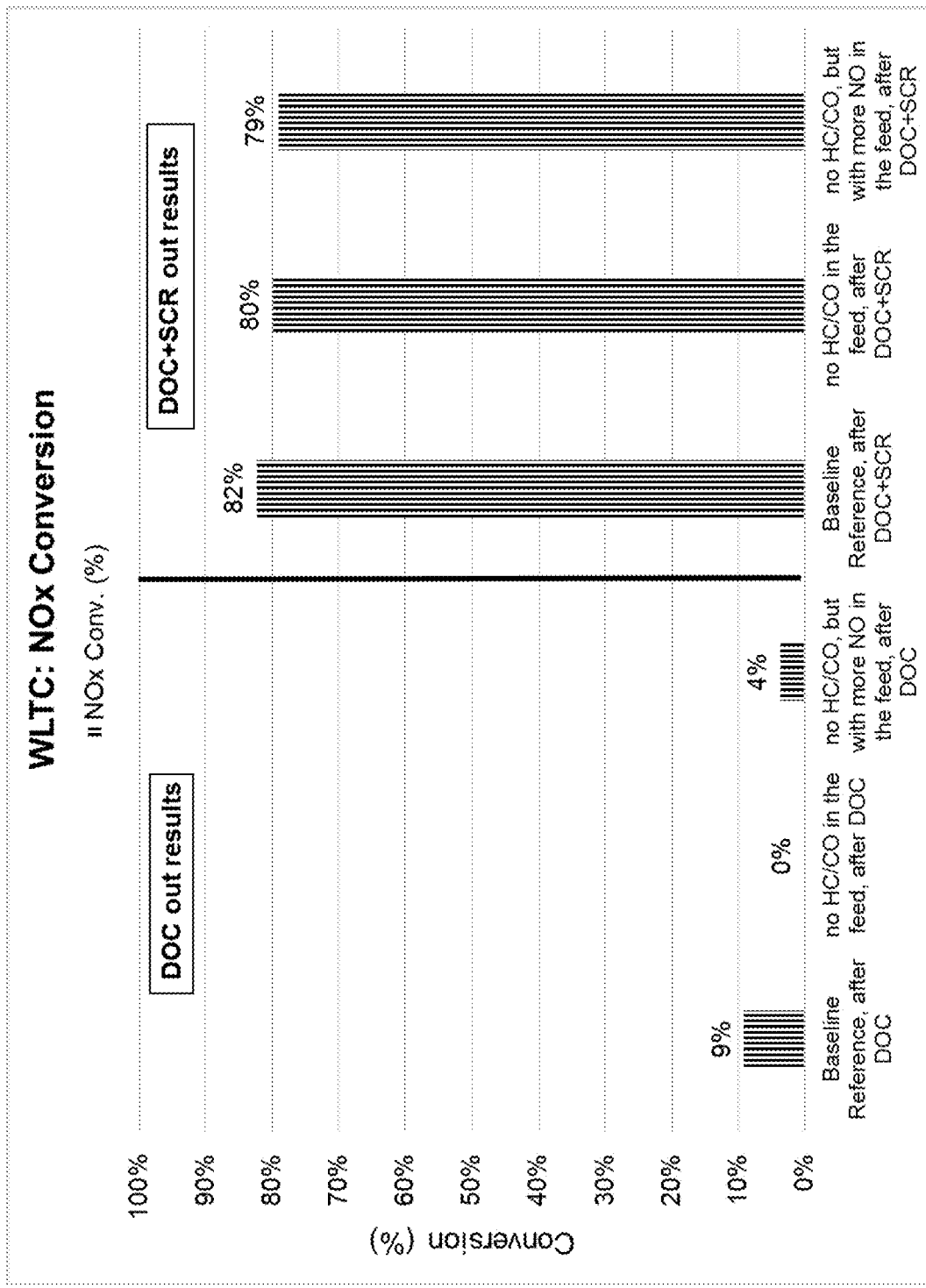
FIG. 6 depicts NOx conversion, under various scenarios, after either a DOC or after the exemplary embodiment of FIG. 4.

FIG. 6 depicts $NO_x$ conversion performance under WLTC protocol for the three experiments for exhaust treatment systems comprising the DOC article of Example 1, either alone or in combination with the SCR article of Example 4. Inlet $NO_x$ profiles correspond to 0.98 g and 1.26 g of $NO_x$ engine out emissions for experiments 1&2 and experiment 3, respectively.

Results for % conversion of CO, HC, and $NO_x$, for the DOC article only, are set forth in Table 2 below.

TABLE 2

|  | CO | HC | $NO_x$ |
| --- | --- | --- | --- |
| Experiment 1 (base line) | 70 | 90 | 9 |
| Experiment 2 | — | — | 0 |
| Experiment 3 | — | — | 4 |

Results for % conversion of CO, HC and NOx on the DOC+SCR exhaust treatment system are set forth in Table 3 below.

TABLE 3

|  | CO | HC | $NO_x$ |
| --- | --- | --- | --- |
| Experiment 1 (base line) | 69 | 88 | 82 |
| Experiment 2 | — | — | 80 |
| Experiment 3 | — | — | 79 |

The above results show that a DOC+SCR exhaust treatment system can manage $NH_3$-fueled vehicle applications for Euro7 applications.

Figure 7:
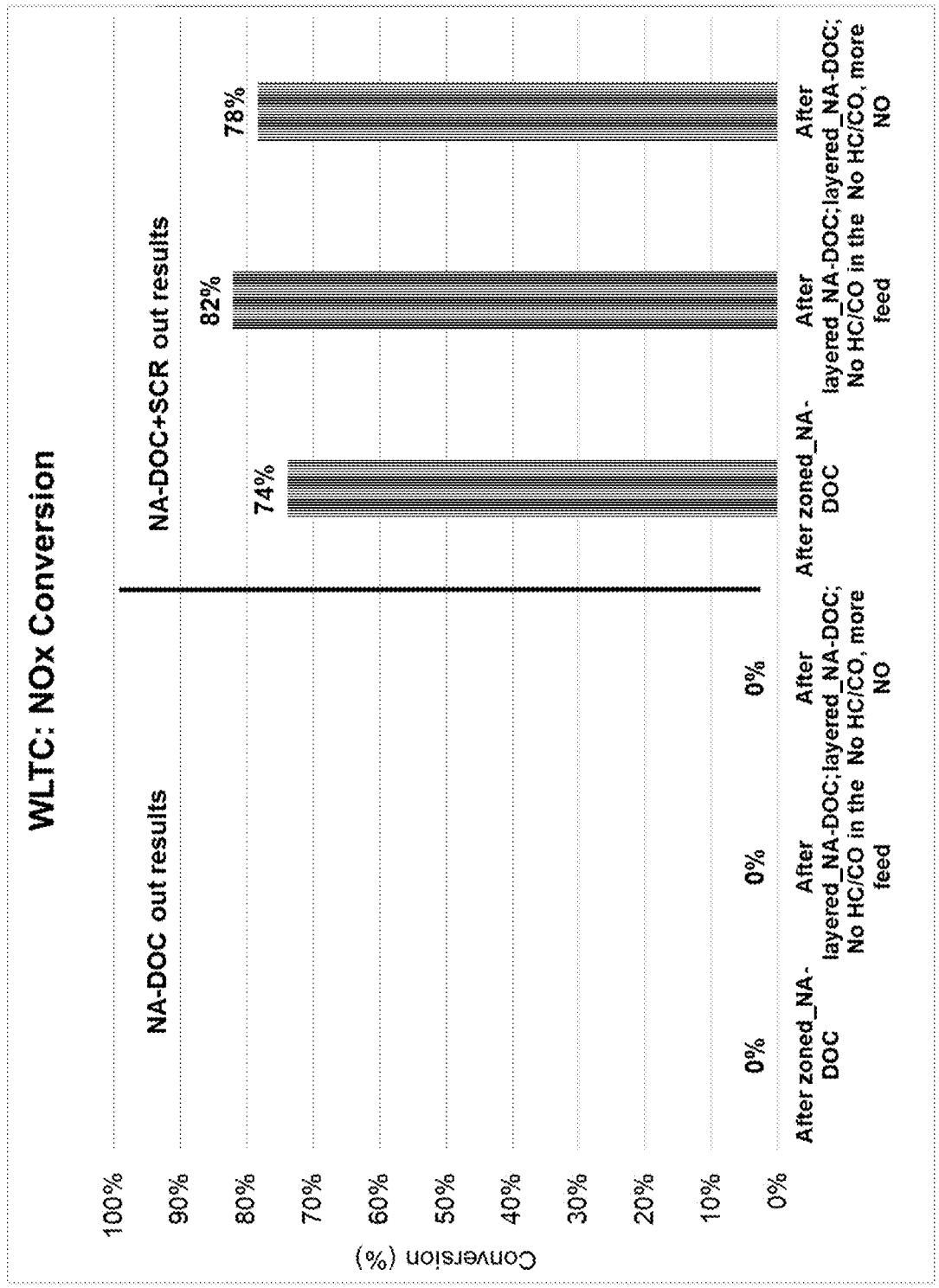
FIG. 7 depicts NOx conversion, under various scenarios, after either a zoned LTNA-DOC or a layered LTNA-DOC or after exemplary embodiments of exhaust treatment systems of the present disclosure.

Regarding Examples 2 and 3, FIG. 7 depicts NOx conversion under WLTC protocol for the three experiments, where the LT-NA-DOC article of Example 2, either alone or in combination with the SCR article of Example 4, under the conditions of Experiment 1, and the LT-NA-DOC article of Example 3, either alone or in combination with the SCR article of Example 4, under the conditions of Experiments 2 and 3. Inlet NOx profiles correspond to 0.98 g and 1.26 g of NOx engine out emissions for Experiments 1&2 and Experiment 3, respectively.

Results for % conversion of CO, HC, and $NO_x$, for the both LT-NA-DOC articles only, are set forth in Table 4 below.

TABLE 4

|  | CO | HC | $NO_x$ |
| --- | --- | --- | --- |
| Example 2/ Experiment 1 (base line) | 67 | 72 | 0 |
| Example 3/ Experiment 2 | — | — | 0 |

TABLE 4-continued

|  | CO | HC | NO$_x$ |
|---|---|---|---|
| Example 3/ Experiment 3 | — | — | 0 |

Results for % conversion of CO, HC and NOx for both LN-NA-DOC+SCR exhaust treatment systems are set forth in Table 5 below.

TABLE 5

|  | CO | HC | NO$_x$ |
|---|---|---|---|
| Example 2/ Experiment 1 (base line) | 67 | 76 | 74 |
| Example 3/ Experiment 2 | — | — | 82 |
| Example 3/ Experiment 3 | — | — | 78 |

The above results show that a LT-NA-DOC+SCR exhaust treatment system can manage NH$_3$-fueled vehicle applications for Euro7 applications.

Figure 8:
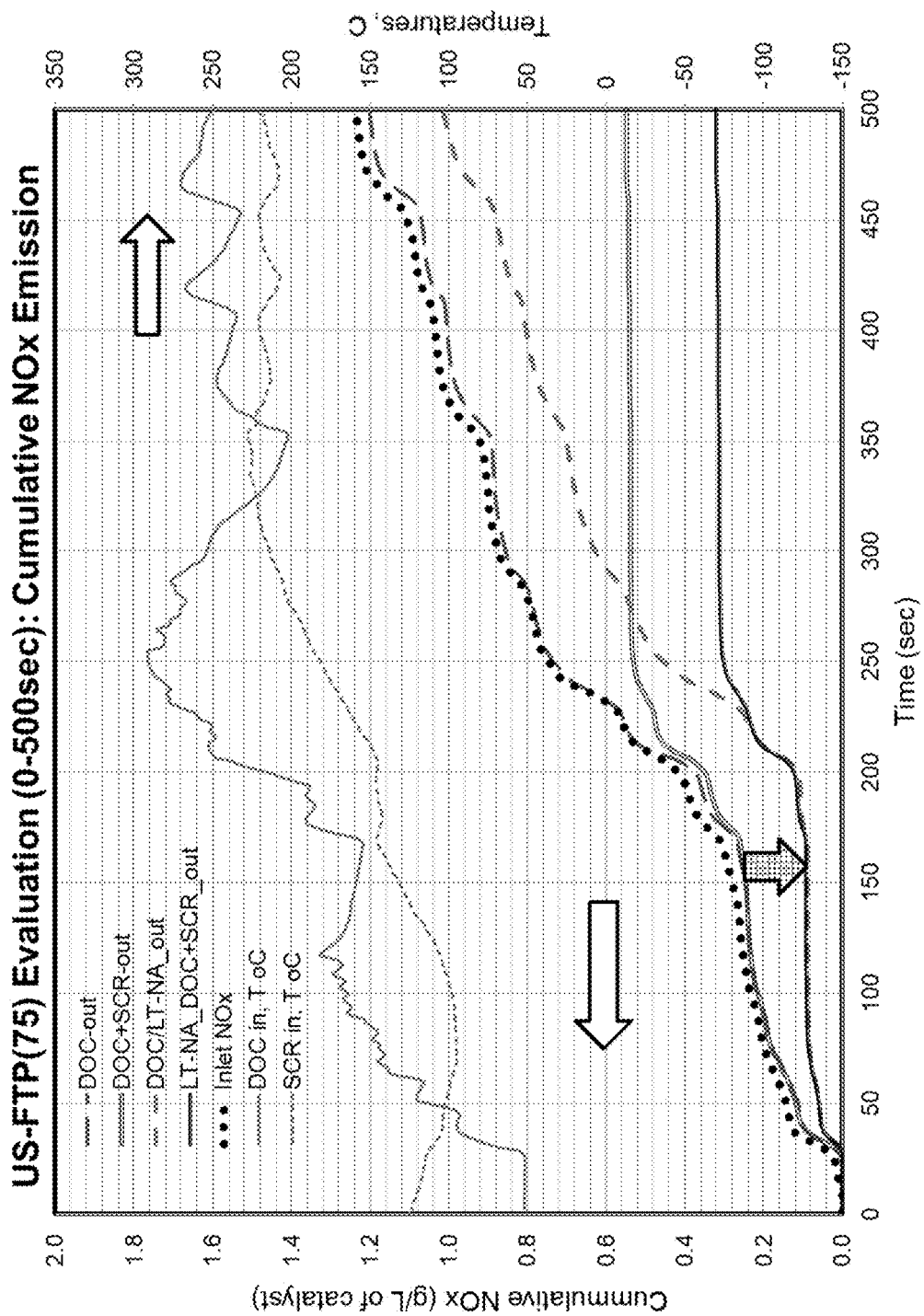
FIG. 8 depicts cumulative NOx emission after exemplary embodiments of exhaust treatment systems of the present disclosure.

FIG. 8 depicts cumulative NOx emission under the FTP cold start US06 protocol, after the DOC+SCR system of Examples 1 and 4, and after the LT-NA-DOC+SCR exhaust treatment system of Examples 3 and 4, for the first 500 seconds of the FTP cycle.

Figure 9:
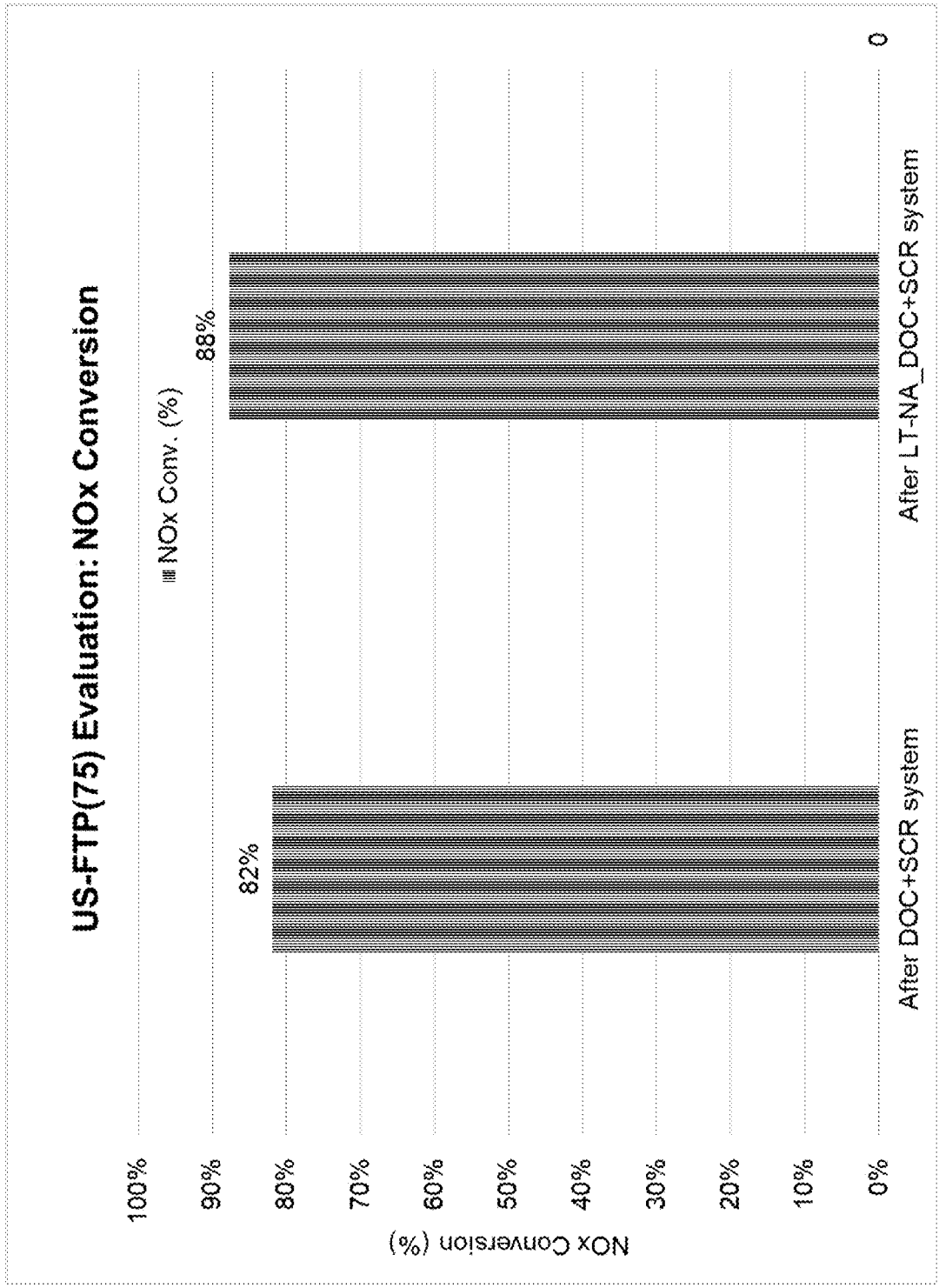
FIG. 9 depicts NOx conversion after exemplary embodiments of exhaust treatment systems of the present disclosure.

FIG. 9 depicts NOx conversion under the FTP cold start US06 protocol, after the DOC+SCR system of Examples 1 and 4, and after the LT-NA-DOC+SCR exhaust treatment system of Examples 3 and 4, for the first 500 seconds of the FTP cycle.

The results of FIGS. 8 and 9 indicate that a LT-NA-DOC+SCR exhaust treatment system can manage NH$_3$-fueled vehicle exhausts for Euro7 applications, and further evidence that a LT-NA-DOC article can improve the overall exhaust treatment system performance for NOx abatement.

The NOx conversion performance for the LT-NA-DOC+SCR system, shown in FIGS. 8 and 9, suggests that the use of LT-NA-DOC article reduces more than 50% of the cold start NOx emissions for the first 500 s of the FTP cycle (FIG. 8). Overall, the application of LT-NA-DOC article enhances NOx conversion for the entire exhaust treatment system by 6% (from 82% to 88%), as shown in FIG. 9 and reported in Table 6 below.

TABLE 6

|  | CO | HC | NO$_x$ |
|---|---|---|---|
| DOC + SCR | 90 | 88 | 82 |
| LT-NA-DOC + SCR | 90 | 92 | 88 |

What is claimed is:

1. An emission treatment system for NO$_x$ abatement in an exhaust stream of an ammonia-fueled engine, the emission treatment system comprising:
   a selective catalytic reduction (SCR) catalyst disposed on a substrate in fluid communication with the exhaust stream of the ammonia-fueled engine; and
   an oxidation catalyst disposed on a substrate positioned upstream and/or downstream of the SCR catalyst and in fluid communication with the exhaust stream and the SCR catalyst, wherein the oxidation catalyst is a diesel oxidation catalyst (DOC).

2. The emission treatment system of claim 1, wherein the oxidation catalyst comprises a refractory metal oxide support impregnated with a platinum group metal (PGM).

3. The emission treatment system of claim 2, wherein the PGM comprises platinum, palladium, or a combination thereof.

4. The emission treatment system of claim 2, wherein the oxidation catalyst further comprises a refractory metal oxide support impregnated with a non-PGM transition metal, an alkaline earth metal, or a combination thereof.

5. The emission treatment system of claim 4, wherein the non-PGM transition metal comprises manganese.

6. The emission treatment system of claim 4, wherein the alkaline earth metal comprises barium.

7. The emission treatment system of claim 1, wherein the SCR catalyst comprises a metal-promoted molecular sieve, a vanadia-based composition, or a combination thereof.

8. The emission treatment system of claim 1, wherein the SCR catalyst and the oxidation catalysts are present in the form of an SCR/AMOx catalyst.

9. The emission treatment system of claim 1, wherein the SCR catalyst is a copper-, an iron-, or a manganese-containing zeolite.

10. The emission treatment system of claim 9, wherein the zeolite has a framework type chosen from LEV, CHA, AEI, MEI, FER, or a combination thereof.

11. The emission treatment system of claim 10, further comprising one or more adsorption components chosen from a low-temperature NO$_x$ adsorber (LT-NA), a low temperature ammonia adsorber (LT-AA), a low temperature water vapor adsorber (LT-WA), or a combination thereof.

12. The emission treatment system of claim 11, wherein the one or more adsorption components are arranged in any order and combination.

13. The emission treatment system of claim 11, wherein each of the one or more adsorption components is disposed on a substrate, positioned upstream or downstream of the SCR catalyst, and in fluid communication with the exhaust stream and the SCR catalyst.

14. The emission treatment system of claim 11, wherein each of the one or more adsorption components are disposed on the same substrate as a mixture, in a zoned configuration, or in a layered configuration.

15. The emission treatment system of claim 11, wherein one or more of the SCR catalyst, the oxidation catalyst, and the one or more adsorption components are disposed on the same substrate, as a mixture, in a zoned configuration, or in a layered configuration.

16. The emission treatment system of claim 11, wherein the one or more adsorption components and a DOC are disposed on the same substrate as a mixture, in a zoned configuration, or in a layered configuration.

17. The emission treatment system of claim 11, wherein the LT-NA is present and comprises a molecular sieve, impregnated with at least one platinum group metal component, or a metal organic framework (MOF).

18. The emission treatment system of claim 11, wherein the LT-AA is present and comprises a molecular sieve or a MOF.

19. The emission treatment system of claim 11, wherein the LT-WA is present and chosen from molecular sieves, clays, activated charcoal, activated alumina, silica, calcium sulfate, calcium chloride, a MOF, and combinations thereof.

20. The emission treatment system of claim 11, wherein one or more of the SCR catalyst, the one or more adsorption components, and the oxidation catalyst are disposed on a flow-through substrate in the form of a honeycomb having a plurality of longitudinally-extending gas flow passages extending from an inlet to an outlet, and/or wherein one or more of the SCR catalyst, the one or more adsorption components, and the oxidation catalyst are disposed on a wall-flow substrate or optionally on a metal substrate with flow-through channels wherein a part of the exhaust gas is in fluid communication between channels.

21. The emission treatment system of claim 1, further comprising one or more additional SCR catalysts, one or more additional oxidation catalysts, or combinations thereof.

22. The emission treatment system of claim 21, comprising, in order, beginning with the emission treatment component closest to the engine, one of the following arrangements:
(a) Adsorption component(s), DOC, SCR catalyst, and AMOx;
(b) SCR, Adsorption component(s), DOC, and AMOx;
(c) Adsorption component(s), SCR catalyst, DOC, SCR catalyst, and AMOx;
(d) Adsorption component(s), SCR catalyst, and AMOx;
(e) Adsorption component(s), DOC, and SCR catalyst;
(f) SCR catalyst, AMOx, and adsorption component(s);
(f) SCR catalyst and AMOx; or
(g) DOC and SCR catalyst.

23. The emission treatment system for $NO_x$ abatement in an exhaust stream of an ammonia-fueled engine according to claim 1, further comprising:
one or more adsorption components disposed on a substrate positioned upstream of the SCR catalyst and in fluid communication with the exhaust stream and the SCR catalyst, the adsorption components being chosen from low temperature $NO_x$ adsorbers (LT-NA), low temperature ammonia adsorbers (LT-AA), low temperature water vapor adsorbers (LT-WA), and combinations thereof.

24. A method for abating $NO_x$ in an exhaust stream from an ammonia-fueled engine, the method comprising contacting the exhaust gas stream with the emission treatment system of claim 1.

* * * * *